(12) United States Patent
Bao et al.

(10) Patent No.: US 12,309,663 B2
(45) Date of Patent: May 20, 2025

(54) PRS REPORTS WITH DISTRIBUTED ANTENNA SYSTEM

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 17/449,645

(22) Filed: Sep. 30, 2021

(65) Prior Publication Data

US 2022/0124458 A1   Apr. 21, 2022

Related U.S. Application Data

(60) Provisional application No. 63/092,120, filed on Oct. 15, 2020.

(51) Int. Cl.
*H04W 4/029* (2018.01)
*H04L 5/00* (2006.01)
(Continued)

(52) U.S. Cl.
CPC ........... *H04W 4/029* (2018.02); *H04L 5/0048* (2013.01); *H04W 24/10* (2013.01); *H04W 64/00* (2013.01); *H04W 72/20* (2023.01)

(58) Field of Classification Search
CPC ..... H04W 4/023; H04W 56/00; H04W 84/18; H04W 72/12; H04W 72/23; H04W 8/005;
(Continued)

(56) References Cited

U.S. PATENT DOCUMENTS 9,967,766 B2 * 5/2018 Kinthada Venkata ....................... H04W 24/10
10,317,509 B2 * 6/2019 Fischer ................ H04L 5/0048
(Continued)

FOREIGN PATENT DOCUMENTS

CN    108702197 A  * 10/2018  ........... H04B 7/0802
EP      3424153 B1 *  3/2020  ........... H04B 7/0802
(Continued)

OTHER PUBLICATIONS

H. Yin, B. Wang, N. Li, J. Zhu and X. She, "Analysis of NR Positioning Evolution: From Scenarios to Techniques," 2022 IEEE 8th International Conference on Computer and Communications (ICCC), Chengdu, China, 2022, pp. 469-474, doi: 10.1109/ICCC56324.2022.10065808. (Year: 2022).*
(Continued)

*Primary Examiner* — William D Cumming
(74) *Attorney, Agent, or Firm* — Qualcomm/Norton Rose Fulbright US LLP

(57) ABSTRACT

Systems, methods, and devices for wireless communication that support antenna configuration indicated by PRS feedback are described. In a first aspect, a method of wireless communication includes receiving, by a wireless communication device, a positioning reference signal (PRS) configuration transmission from a network entity. The method also includes determining, by the wireless communication device, a PRS measurement report based on an antenna configuration. The method further includes transmitting, by the wireless communication device, the PRS measurement report indicating the antenna configuration.

25 Claims, 14 Drawing Sheets

(51) Int. Cl.
*H04W 24/10* (2009.01)
*H04W 64/00* (2009.01)
*H04W 72/20* (2023.01)

(58) Field of Classification Search
CPC ... H04W 64/00; H04W 36/088; H04W 24/10; H04L 5/005
USPC ........................................ 455/456.1; 375/295
See application file for complete search history.

(56) References Cited

U.S. PATENT DOCUMENTS

| | | | | |
|---|---|---|---|---|
| 10,368,195 | B2* | 7/2019 | Tian | H04W 8/005 |
| 10,638,263 | B2* | 4/2020 | Tian | H04W 4/023 |
| 11,382,136 | B2* | 7/2022 | Deng | H04B 7/0617 |
| 11,889,436 | B2* | 1/2024 | King | H04B 17/14 |
| 2008/0090588 | A1* | 4/2008 | Mizugaki | H04W 84/18 |
| | | | | 455/456.1 |
| 2010/0207820 | A1* | 8/2010 | Kawano | G01S 11/02 |
| | | | | 342/393 |
| 2010/0310005 | A1* | 12/2010 | Takagi | H04B 7/0684 |
| | | | | 375/295 |
| 2015/0215793 | A1 | 7/2015 | Siomina et al. | |
| 2017/0251391 | A1* | 8/2017 | Kinthada Venkata | |
| | | | | H04W 36/0088 |
| 2017/0285132 | A1* | 10/2017 | Fischer | H04W 72/12 |
| 2017/0288830 | A1* | 10/2017 | Fischer | H04W 72/23 |
| 2018/0167775 | A1* | 6/2018 | Tian | H04W 8/005 |
| 2019/0335416 | A1* | 10/2019 | Kumar | H04L 5/005 |
| 2019/0342705 | A1* | 11/2019 | Tian | H04W 4/023 |
| 2021/0266859 | A1 | 8/2021 | Yu et al. | |
| 2022/0043099 | A1* | 2/2022 | Da | H04W 4/023 |
| 2022/0124458 | A1* | 4/2022 | Bao | H04W 64/00 |
| 2022/0131727 | A1* | 4/2022 | Khoryaev | H04L 27/261 |
| 2022/0173784 | A1* | 6/2022 | Gao | H04B 7/0874 |
| 2022/0173857 | A1* | 6/2022 | Michalopoulos | H04W 24/08 |
| 2022/0386093 | A1* | 12/2022 | Baek | H04W 56/00 |
| 2023/0258761 | A1* | 8/2023 | Karjalainen | H04W 64/006 |
| | | | | 455/456.1 |
| 2024/0019382 | A1* | 1/2024 | Oishi | G01N 22/04 |
| 2024/0118123 | A1* | 4/2024 | Pflüger | G01F 23/284 |
| 2024/0314609 | A1* | 9/2024 | Manolakos | G01S 5/0036 |

FOREIGN PATENT DOCUMENTS

| | | | | |
|---|---|---|---|---|
| WO | WO-0131733 A1 * | 5/2001 | | H01Q 1/242 |
| WO | WO-2011013220 A1 * | 2/2011 | | G01S 5/06 |
| WO | WO-2017151312 A1 * | 9/2017 | | H04B 7/0802 |
| WO | WO-2017164925 A1 | 9/2017 | | |
| WO | WO-2020088350 A1 | 5/2020 | | |
| WO | WO-2020153892 A1 | 7/2020 | | |
| WO | WO-2021229026 A1 | 11/2021 | | |
| WO | WO-2022082142 A2 * | 4/2022 | | G01S 5/0036 |

OTHER PUBLICATIONS

International Search Report and Written Opinion—PCT/US2021/071676—ISA/EPO—Jul. 6, 2022.
ERICSSON: "Potential Positioning Enhancements", 3GPP TSG-RAN WG1 Meeting #103-e, 3GPP Draft, R1-2008765, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), pp. 1-41, XP051939650, Retrieved from the Internet: URL: https://www.3gpp.org/ftp/tsg_ran/WG1_RL1/TSGR1_103-e/Docs/R1-2008765.zip R1-2008765.docx [retrieved on Oct. 16, 2020] pp. 7-15, section 2.2.1, section 2.2.4, section 2.3.4, Positioning accuracy enhancements for multiple antenna panel UE.
Partial International Search Report—PCT/US2021/071676—ISA/EPO—Mar. 25, 2022.

* cited by examiner

```
NR-DL-TDOA-SignalMeasurementInformation-r16 ::= SEQUENCE {
    dl-PRS-ReferenceInfo-r16      DL-PRS-IdInfo-r16,
    nr-DL-TDOA-MeasList-r16       NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    trp-ID-r16                          TRP-ID-r16,
    nr-DL-PRS-ResourceId-r16            NR-DL-PRS-ResourceId-r16            OPTIONAL,
    nr-DL-PRS-ResourceSetId-r16         NR-DL-PRS-ResourceSetId-r16         OPTIONAL,
    nr-TimeStamp-r16                    NR-TimeStamp-r16,
    nr-RSTD-r16                         INTEGER (0..ffs),   -- FFS on the value range
    nr-AdditionalPathList-r16           NR-AdditionalPathList-r16           OPTIONAL,
    nr-TimingMeasQuality-r16            NR-TimingMeasQuality-r16,
    nr-PRS-RSRP-Result-r16              INTEGER (FFS)                       OPTIONAL,
    -- FFS, value range to be decided in RAN4.
    nr-DL-TDOA-AdditionalMeasurements-r16
                                        NR-DL-TDOA-AdditionalMeasurements-r16   OPTIONAL,
    ...
}
```

*FIG. 3*

PRS REPORTS WITH DISTRIBUTED ANTENNA SYSTEM

CROSS-REFERENCE TO RELATED APPLICATIONS

This application claims the benefit of U.S. Provisional Patent Application No. 63/092,120, entitled, "PRS REPORTS WITH DISTRIBUTED ANTENNA SYSTEM," filed on Oct. 15, 2020, (2100171P1) the disclosure of which is hereby incorporated by reference herein in its entirety as if fully set forth below and for all applicable purposes.

TECHNICAL FIELD

Aspects of the present disclosure relate generally to wireless communication systems, and more particularly, to Positioning Reference Signal (PRS) operations. Certain embodiments of the technology discussed below may enable and provide PRS report and operation enhancements for distributed antenna systems.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes receiving, by a wireless communication device, a positioning reference signal (PRS) configuration transmission from a network entity; determining, by the wireless communication device, a PRS measurement report based on an antenna configuration; and transmitting, by the wireless communication device, the PRS measurement report, the PRS measurement report indicating the antenna configuration.

In an additional aspect of the disclosure, an apparatus includes at least one processor and a memory coupled to the at least one processor. The at least one processor is configured to receive a positioning reference signal (PRS) configuration transmission from a network entity; receive a PRS transmission from a wireless communication device based on the PRS configuration transmission; perform a measurement operation on the PRS transmission based on an antenna configuration; and transmit a PRS measurement report based on the measurement operation, the PRS measurement report indicating the antenna configuration.

In another aspect of the disclosure, a method for wireless communication includes transmitting, by a network entity, a positioning reference signal (PRS) configuration transmission to a wireless communication device; and receiving, by the network entity from the wireless communication device, a PRS measurement report indicating a new antenna configuration for the wireless communication device.

In an additional aspect of the disclosure, an apparatus includes at least one processor and a memory coupled to the at least one processor. The at least one processor is configured to transmit a positioning reference signal (PRS) configuration transmission to a wireless communication device; and receive, from the wireless communication device, a PRS measurement report indicating a new antenna configuration for the wireless communication device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a diagram illustrating an example of information elements for positioning information.

Like reference numbers and designations in the various drawings indicate like elements.

DETAILED DESCRIPTION

Figure 1:
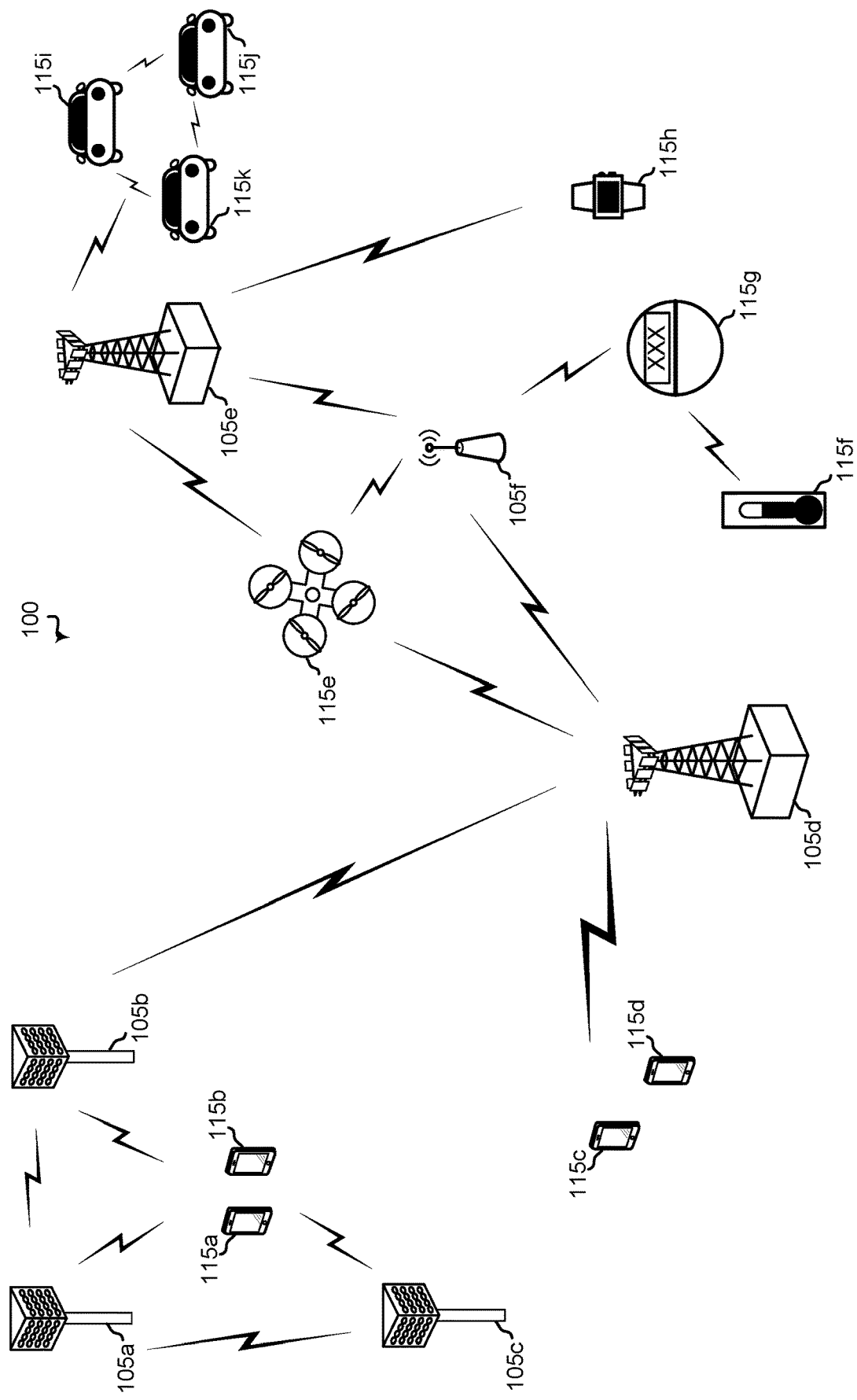
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail device or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspect. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
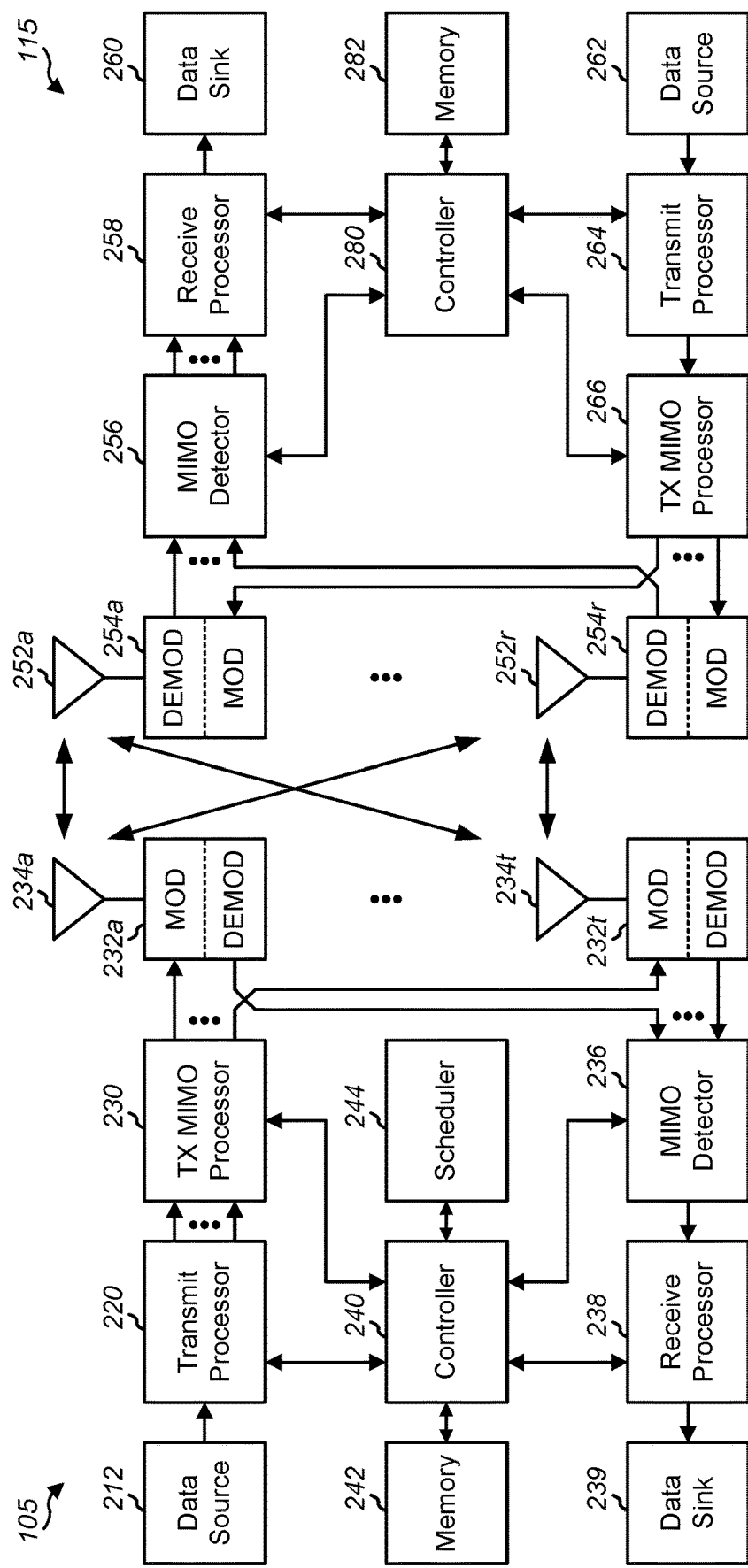
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 10 and 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Multi-antenna system have the advantage of better antenna gain. For example, performing time of arrival (TOA) measurement and/or angle measurement with multiple antennas can enable improved beamforming.

For some UE's with distributed antennas/multiple antenna panels, combining signals from different antennas/panels may not provide benefits in real world performance or it is too complicated to align the phases between the different antennas/panels.

On the contrary, antenna diversity has the ability provide better performance. As examples of antenna diversity, multiple panels on cells phones provide antenna diversity and/or multiple panels on larger devices, such as a car with antennas on front and rear bumpers, provide antenna diversity. With a distributed antenna array, a device may switch beams across subarrays or panels for better measurements. Thus, the device may reduce errors and improve performance by using information from one or more other devices (e.g., a network) to minimize errors (e.g., position estimation errors caused by calibration errors).

The calibration errors may refer to the uncertainty in the RF chain. Switching antenna panels may reduce or minimize the measurement errors to be a that of a panel with the smallest calibration error. When you switch the panel, the physical location of the antenna for positioning reference signal (PRS) reception or transmission changes. This location switch causes the TOA to change. To illustrate, the TOA is different for a particular PRS from a transmitting device depending on if the PRS is received with a first panel or a second panel because the physical distance is different. Therefore, if this info is not provided to the network (e.g., a Location Management Function), the positioning accuracy will be reduced.

Therefore, the UE may switch the antenna configuration, conduct a measurement with the configuration, and inform the network about this change. The UE may report the antenna change through a measurement report, referred to as a PRS report or PRS measurement report. The PRS report may include or correspond to a positioning report, such as a Time Difference of Arrival (TDOA) measurement report. The PRS report may be in transmitted in or as a downlink control information (DCI), an uplink control information (UCI), a sidelink control information (SCI), Medium Access Control Control Element (MAC CE), or LTE Positioning Protocol (LPP) transmission. Accordingly, errors can be reduced which would otherwise be incurred when the UE changes the antenna configuration.

FIG. 3 illustrates an example of an information element for a TDOA measurement report and a sub-element thereof. In FIG. 3, a downlink TDOA signal measurement information element is shown and a measurement list information element thereof is shown. Such an information element may be used to report positioning measurement information which may be determined based on a reference signal for positioning, such as a positioning reference signal (PRS).

Figure 4:
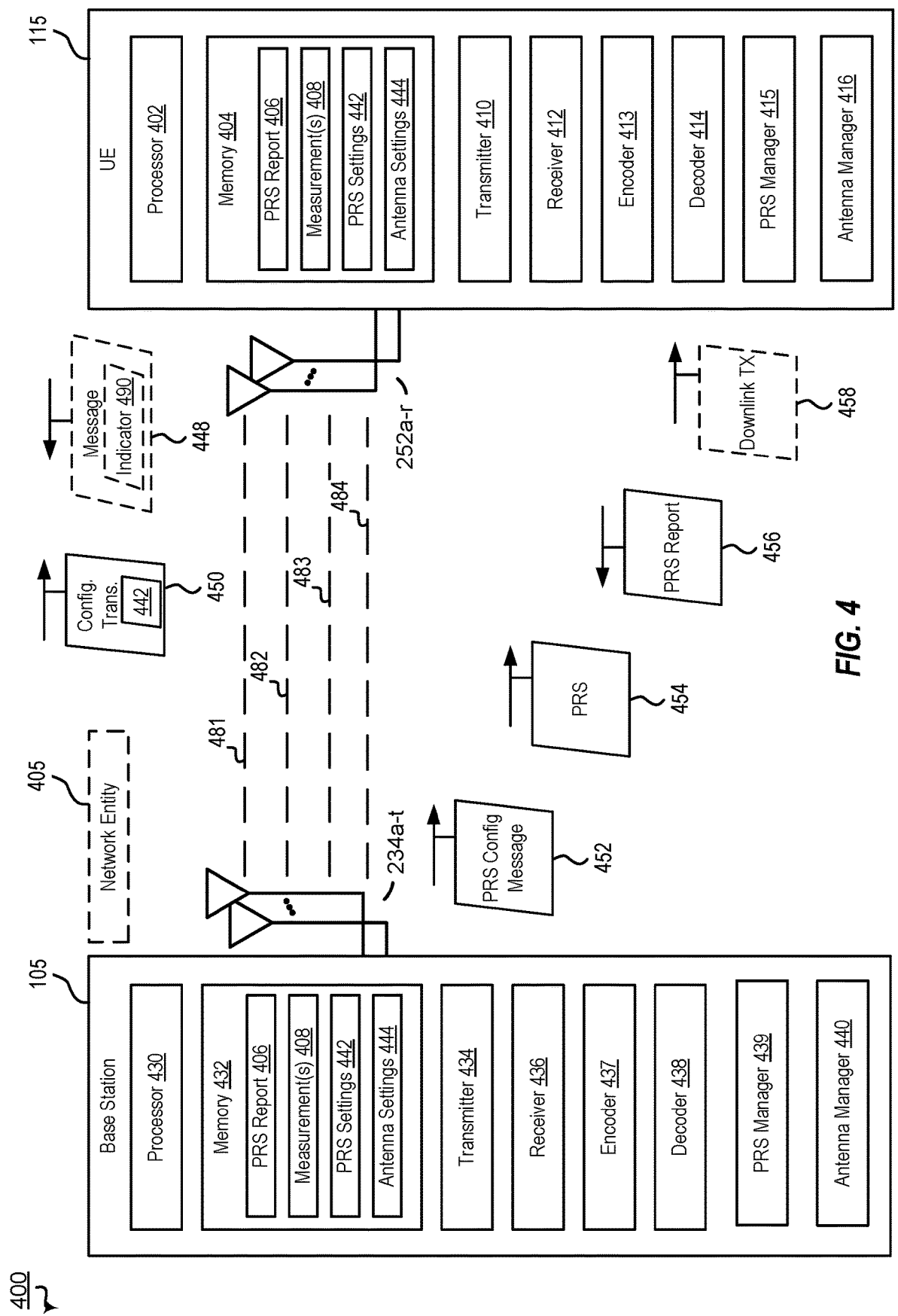
FIG. 4 is a block diagram illustrating an example wireless communication system that supports antenna configuration indication by PRS reports according to one or more aspects.

FIG. 4 illustrates an example of a wireless communications system 400 that supports enhanced PRS operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105, a UE 115, and a network entity 405. Enhanced PRS operations may increase positioning accuracy, reduce positioning errors, and increase throughput. Thus, network and device performance can be increased.

Wireless communication devices, such as base station 105 and UE 115, may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave"

band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated using MAC CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, PRS manager 415, antenna manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store PRS report data 406, measurement data 408, PRS settings data 442, antenna settings data 444, or a combination thereof, as further described herein.

The PRS report data 406 includes or corresponds to data associated with or corresponding to feedback for PRS transmissions. For example, the PRS report data 406 may indicate measurement information determined from performing measurements on a PRS transmission. The PRS report data 406 may also include an antenna configuration used by the device to receive the PRS transmission and/or measure the PRS transmission.

The measurement data 408 includes or corresponds to data indicating or corresponding to position reference measurements. For example, the measurement data 408 may include data indicating position related measurements for a reference signal, such as a PRS. Such position related may include timing based measurements, such as time of arrival (TOA) or round trip time (RTT).

The PRS settings data 442 includes or corresponds to data associated with enhanced PRS operations. The PRS settings data 442 may include PRS settings data for PRS transmissions and PRS reporting. For example, the PRS settings data 442 may have data indicating transmission resources for reference signal transmissions and reporting transmissions. As another example, the PRS settings data 442 may include data indicating a reporting format and/or an antenna configuration report type. To illustrate, the antenna configuration may be appended to or embedded in the report and/or may be explicitly included in or indicated by an index.

The antenna settings data 444 includes or corresponds to data associated with antenna settings. The antenna settings data 444 may contain data which indicates an antenna configuration and/or an antenna placement. For example, such data may indicate or include an antenna location (e.g., antenna coordinates), an antenna type (e.g., a directional antenna or an omnidirectional antenna), antenna spacing, a beam width, a direction/angle, or a combination thereof. In some implementations, a particular antenna configuration may include or be associated with a single path or multiple paths.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. PRS manager 415 may be configured to determine and perform PRS operations. For example, PRS manager 415 is configured to determine what resource or resources to use for PRS transmission and PRS feedback, such as when and where to perform reference signal transmissions and feedback transmissions therefore. As another example, PRS manager 415 is configured to perform measurement operations on PRS transmissions. In some implementations, PRS manager 415 is configured to determine whether to perform one measurement operation or multiple measurement operations, such as first and second measurement operations. The PRS manager 415 may be configured to include antenna configuration in the PRS feedback (e.g., indicate an antenna configuration in a PRS report).

Antenna manager 416 may be configured to determine and perform antenna configuration operations. For example, antenna manager 416 may be configured to determine whether to change an antenna configuration and optionally, the settings of the antenna configuration. The antenna manager 416 may be further configured to antenna configuration operations for positioning (e.g., PRS) feedback transmission.

Base station 105 includes processor 430, memory 432, transmitter 434, receiver 436, encoder 437, decoder 438, PRS manager 439, antenna manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store PRS report data 406, measurement data 408, PRS settings data 442, antenna settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. PRS manager 439 may include similar functionality as described with reference to PRS manager 415. Antenna manager 440 may include similar functionality as described with reference to antenna manager 416.

During operation of wireless communications system 400, base station 105 and/or network entity 405 may determine that UE 115 has enhanced PRS feedback capability. For example, base station 105 may transmit a message 448 that includes an enhanced PRS report indicator 490 (e.g., an antenna configuration report indicator). Indicator 490 may indicate enhanced PRS operation capability for PRS reporting or a particular type or mode of PRS operation. In some implementations, a network entity (e.g., a network entity 405) or base station 105 sends control information to indicate to UE 115 that enhanced PRS operation and/or a particular type of enhanced PRS feedback operation is to be used. For example, in some implementations, message 448 (or another message, such as configuration transmission 450) is transmitted by the base station 105 or the network entity 405. The configuration transmission 450 may include or indicate to use enhanced PRS feedback operations or to adjust or implement a setting of a particular type of enhanced PRS feedback operation. For example, the configuration transmission 450 may include 442, as indicated in the example of FIG. 4, 444, or both.

During operation, devices of wireless communications system 400, perform enhanced PRS feedback operations. For example, the wireless communication devices (e.g., a base station and UE) exchange transmissions via a downlink or uplink channel, or the wireless communication devices (e.g., two UEs) exchange transmissions via a sidelink channel. In the example of FIG. 4, the network entity 405 transmits a PRS configuration message 452 to the UE 115 and optionally the base station 105. The PRS configuration message 452 may include or indicate a particular resource selected by the network entity 405 (e.g., a Location Management Function (LMF) thereof) for a PRS transmission and optionally another resource for PRS reporting.

In other examples, the network entity 405 (e.g., LMF) and the base station 105 are collocated. In such implementations, the network entity 405 may generate the PRS configuration message 452 and the base station 105 transmits the PRS configuration message 452 to the UE 115.

The UE 115 may receive the PRS configuration message 452 and may determine a particular resource reserved by the network entity 405 and/or the base station 105. The UE 115 may then monitor for a PRS transmission, such as PRS transmission 454, based on the particular resource indicated by the PRS configuration message 452. For example, the base station 105 may transmit the PRS transmission 452 to the UE 115 and optionally one or more other devices, such as other UEs.

After receiving the PRS configuration message 452, the UE 115 may determine to set or switch an antenna configuration, such as beam width, sub-array parameter, array parameter, panel parameter. The UE 115 may determine an antenna configuration which changes a signal path used by the UE 115. The UE 115 may determine to use such antenna configuration responsive to receiving a message or based on one or more UE determinations. The UE 115 may further determine the new antenna configuration based on the message or based on one or more UE determinations. The new antenna configuration may be used for all transmissions, reception of a certain type of transmission (e.g., reference signal or PRS transmissions), or just as a test configuration, such as used to evaluate one or more reference signals. In some implementations, the UE 115 determines to switch from a first antenna configuration to a second antenna configuration. The second antenna configuration may be based on or associated with a reduced group delay or reduced timing measurement as compared to the first antenna configuration.

The UE 115 and the base station 105 may determine resources for PRS feedback transmission or transmissions based on the PRS transmission 452 and optionally settings information, such as PRS settings data 442, which may be indicated by the PRS configuration message 452. For example, the UE 115 may receive the PRS transmission 454 with the new antenna configuration and may determine the resources for PRS feedback transmission based on resources indicated by the PRS configuration message 452. Using the antenna configuration to receive the PRS transmission 454 may include or correspond to using a delay associated with the antenna configuration (e.g., the group delay) to receive and measure (e.g., directly) the PRS transmission 454. The UE 115 may then transmit one or more feedback transmissions in the one or more determined resources. As another example, the UE 115 may receive the PRS transmission 454 with another antenna configuration and measure the PRS transmission 454 based on the antenna configuration. To illustrate, the UE 115 may use a delay associated with the antenna configuration (e.g., the group delay) when generating or adjusting measurements made with another antenna configuration or to otherwise account for the delay associated with the antenna configuration.

In the example shown in FIG. 4, the UE 115 transmits a PRS report transmission 456 responsive to the PRS transmission 454. The PRS report transmission 456 includes or indicates the new, set or switched antenna configuration of the UE 115. For example, the PRS report transmission 456 may include the changed antenna parameter, include the explicit antenna configuration, or indicate the changed parameter or full configuration by an indicator (e.g., antenna configuration or parameter index).

Additionally, or alternatively, the UE 115 may transmit another PRS report transmission. For example, the UE 115 may transmit a second PRS report transmission including or indicating the antenna configuration of the PRS report transmission 456 if the configuration has not changed. As another example, the UE 115 may transmit a second PRS report transmission including or indicating a new antenna configuration if another antenna change has been made, or indicating no antenna configuration if the antenna configuration has not changed. The PRS report transmission 456 and second PRS report transmission may be sent to the network entity 405, the base station 105, or both.

The network entity 405, the base station 105, or both, may determine a position of the UE 115 based on the antenna configuration indicated by or included in the PRS report transmission 456. The base station 105 may then use the determined position (e.g., updated or more accurate position) to transmit and/or receive one or more other transmissions. In the example of FIG. 4, the base station 105 transmits a downlink transmission 458 to the UE 115 based on or using the determined position (e.g., positioning information). The downlink transmission 458 may include or correspond to a PDSCH transmission or a PDCCH transmission. In addition, the downlink transmission 458 may include or correspond to a higher layer transmission, such as MAC CE or a RRC transmission.

Alternatively, the PRS manager 439 of the network entity 405, the base station 105, or both, may determine positioning assistance information based on the measurements and/or antenna configuration indicated by or included in the PRS report transmission 456. In some such implementations, the positioning assistance information may include or correspond to a group delay or timing measurement associated with the antenna configuration. The group delay associated with the antenna configuration may be used to shift the timing/PRS measurements indicated in the PRS report to generate new measurements (e.g., second or adjusted measurement) or may be used to generate (e.g., adjust) a ranging estimate.

In other implementations, other transmissions may be sent based on the PRS report and antenna configuration indicated thereby. For example, uplink and/or sidelink transmissions may be communicated based on the antenna configuration or positioning information derived therefrom. Additionally, although an uplink or UE based example has been illustrated in FIG. 4, in other implementations, downlink or sidelink implementations may be used in addition to or in the alternative of the uplink or UE based operations. To illustrate, the UE may transmit a PRS transmission and the base station may switch antenna configurations, perform a measurement on the PRS, and transmit a PRS report indicating the switched antenna configuration. As another illustration, two UEs may each send and receive PRS transmissions and reports to and from each other. Additional examples of PRS feedback operations are illustrated in FIGS. 5-9.

Accordingly, the UE 115 and base station 105 may be able to more effectively perform PRS feedback operations to indicate antenna configuration in PRS feedback. Thus, FIG. 4 describes enhanced PRS operations. Using enhanced PRS operations may enable improvements when operating with larger and/or complex devices with multiple antennas. Performing enhanced PRS operations with antenna configuration information enables increased positioning accuracy and signal strength and thus, enhanced UE and network performance by increasing throughput and reducing errors and latency.

Figure 5:
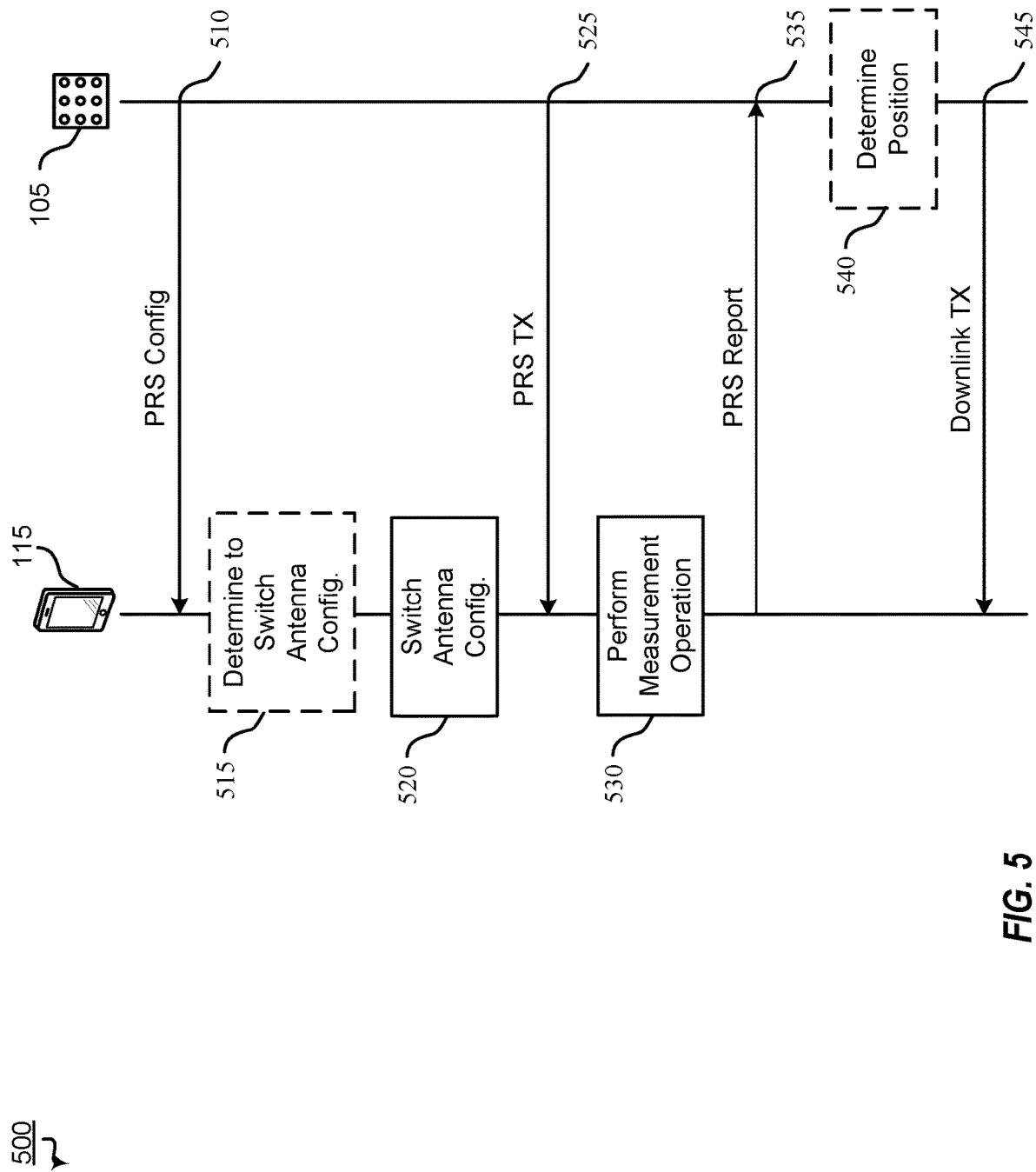
FIG. 5 is a ladder diagram illustrating an example wireless communication system that supports antenna configuration indication by PRS reports according to one or more aspects.

FIGS. 5-9 illustrate examples of ladder diagrams for PRS operations according to some aspects. The examples of FIGS. 5-9 include similar devices to the devices described in FIGS. 1, 2, and 4, such as UE 115 and base station 105. The devices, such as UE 115 and base station 105, of FIGS. 5-9 may include one or more of the components as described in FIGS. 2 and 4. In such FIGS, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate transmissions and receptions. Referring to FIG. 5, FIG. 5 is a ladder diagram 500 of collocated UE-based PRS operations according to some aspects. In the example of FIG. 5, the ladder diagram illustrates a UE 115 and a network entity, such as base station 105 collocated with a LMF.

At 510, the base station 105 (such as a gNB) transmits PRS configuration information to the UE 115. For example, the PRS manager 439 of the base station 105 generates and transmits a PRS configuration message 452 to the UE 115 which includes the PRS configuration information (e.g., 442). The PRS configuration information (e.g., 442) may include information for the PRS transmission itself, for a corresponding report, or both. The information may include settings, formats, transmission resources, etc. The PRS configuration message may include or correspond to a higher layer message, such as a layer 3 message. For example, the base station 105 generates a RRC message which indicates or includes the PRS configuration information. In some implementations, the PRS configuration message is sent to multiple UEs. In other implementations, the PRS configuration message is a PDCCH transmission, such as a DCI, or a MAC CE. Additionally, or alternatively, the PRS configuration message may schedule multiple PRS transmissions and/or reports (e.g., periodic or semi-static) or schedule/trigger a single PRS transmission and report (e.g., aperiodic).

At 515, the UE 115 optionally determines to set an antenna configuration. For example, the antenna manager 416 of the UE 115 determines to set or switch an antenna configuration responsive to receiving a message from another device or based on UE determinations. The UE determinations may include quality condition based determinations, position based determinations, etc., or a combination thereof.

At 520, the UE 115 switches antenna configurations. For example, the antenna manager 416 of the UE 115 determines a new antenna configuration (e.g., 444) and switches from a first antenna configuration to a second (new) antenna configuration. The antenna configuration may include or be associated with multiple signal paths in some implementations. To illustrate, the antenna configuration may include or be configured with TOA measurements of multiple paths. Alternatively, the antenna configuration may include a single configuration and path. The antenna configuration may be received or determined locally at the UE. For example, a test request from the base station 105 may indicate a particular antenna configuration (e.g., single path or multiple paths) for a particular PRS, as described further with reference to FIG. 9. The new antenna configuration may be used for a particular type of transmission, such as PRS transmissions only, or multiple types of transmissions.

At 525, the base station 105 transmits a PRS to the UE 115. For example, the PRS manager 439 of the base station 105 generates and transmits a PRS transmission 454 to the UE 115 for measurement operations. In some implementations, the PRS is sent to multiple devices, such as multiple UEs. In other implementations, the PRS is sent to a single device. Alternatively, another position RS may be used for position measurement operations.

At 530, the UE 115 performs a measurement operation on the PRS based on the switched antenna configuration. For example, the PRS manager 415 of the UE 115 processes and measures the PRS transmission using the antenna configuration (e.g., 444) to generate measurements 408. The UE 115 may measure or evaluate the PRS transmission using a single signal path or multiple signal paths. Measuring or evaluating the PRS transmission for multiple signal paths may include determining multiple measurements for a single PRS transmission.

At 535, the UE 115 transmits a PRS report based on the PRS measurement operation. For example, the PRS manager 415 of the UE 115 generates and transmits a PRS report message 456 including an indication of the antenna configuration to the base station 105, such as a LMF thereof. The PRS report 406 of the PRS report message 456 may be generated and transmitted based on the PRS configuration information. For example, the timing and structure of the PRS report may be determined based on the PRS configuration information. The PRS report message may include or correspond to a higher layer message, such as a layer 3 message. For example, the UE 115 generates a LPP message which includes the PRS measurement report. In other implementations, the PRS report is a PUCCH transmission, such as an uplink control information (UCI), a PUSCH transmission, or a MAC CE. Alternatively, for sidelink operations where the UE 115 receives a PRS from another UE, the PRS report may be a SCI or a MAC CE.

In some implementations, the UE 115 may additionally send the PRS report to one or more other devices, such as another UE, an anchor device, or another base station. Transmission of the PRS report to other devices is described further with reference to FIG. 7-9.

At 540, the base station 105 may optionally determine position information based on the PRS report. For example, the PRS manager 439 of the base station 105 (e.g., a LMF thereof) may determine a position of the UE 115 based on the PRS report, including the antenna configuration indicated thereby, or positioning assistance information, such as information which indirectly indicate the position (e.g., TOA/RTT).

At 545, the base station 105 may transmit a downlink transmission based on the PRS report. For example, the base station 105 (e.g., a LMF thereof) may use the determined position (e.g., updated or more accurate position) of the UE 115 to transmit a PDCCH or PDSCH transmission (e.g., 458).

Thus, in the example in FIG. 5, the devices perform UE-based PRS operations for a network with a collocated architecture. That is, the UE changes an antenna configuration and reports the antenna configuration to the network in a PRS report where the network is a combined base station with a LMF.

Figure 6:
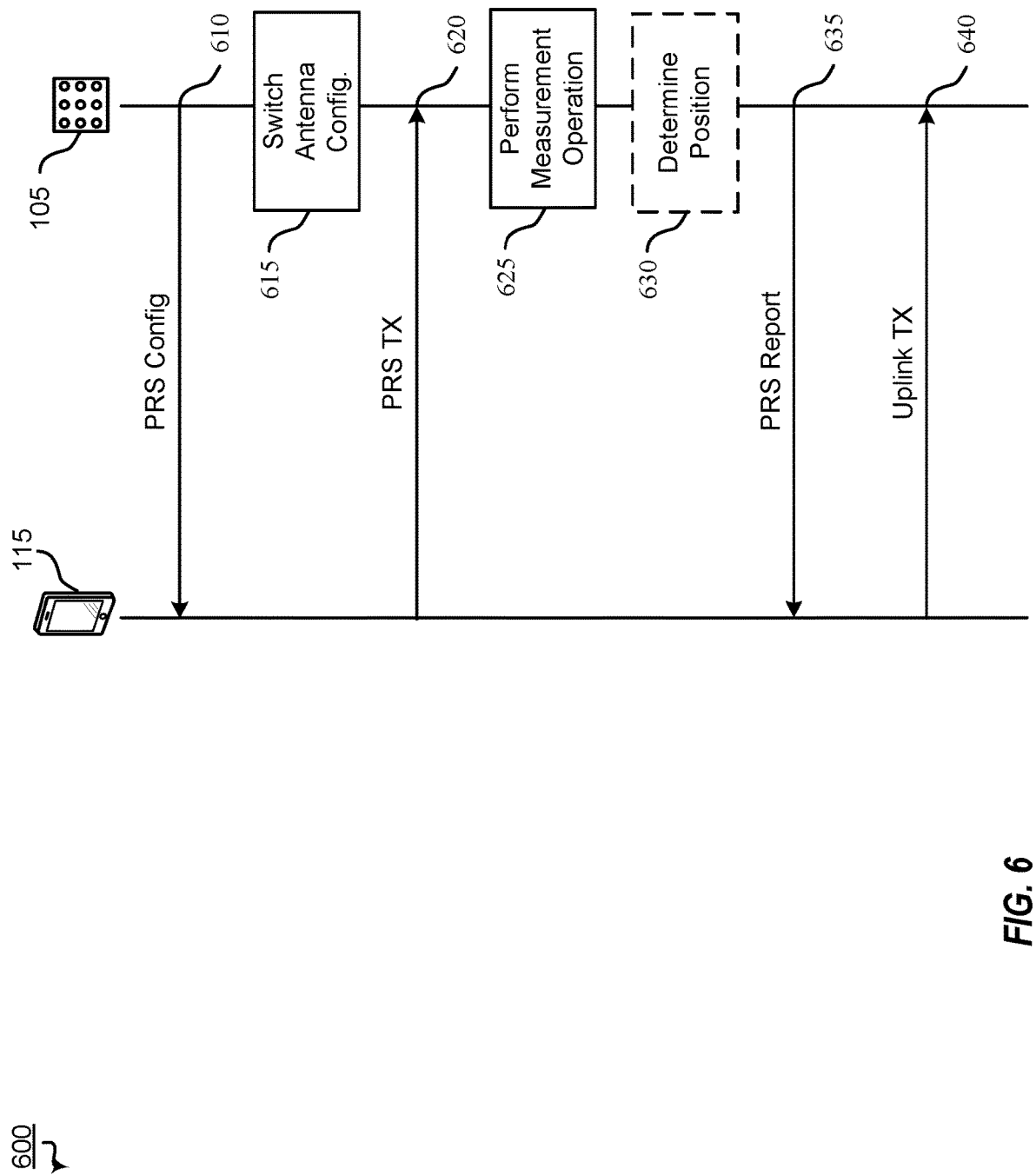
FIG. 6 is a ladder diagram illustrating another example wireless communication system that supports antenna configuration indication by PRS reports according to one or more aspects.

Referring to FIG. 6, FIG. 6 is a ladder diagram 600 of network based PRS operations according to some aspects. In the example of FIG. 6, the ladder diagram illustrates a UE and a network entity, such as base station 105. As compared to the network configuration in the ladder diagram of FIG. 5, the ladder diagram of FIG. 6 illustrates a network generated PRS report with antenna configuration information.

At 610, the base station 105 (such as a gNB) transmits PRS configuration information to the UE 115. For example, the PRS manager 439 of the base station 105 generates and transmits a PRS configuration message 452 to the UE 115 which includes the PRS configuration information (e.g., 442). The PRS configuration information (e.g., 442) may include information for the PRS transmission itself, for a corresponding report, or both. The information may include settings, formats, transmission resources, etc. The PRS configuration message may include or correspond to a higher layer message, such as a layer 3 message. For example, the base station 105 generates a RRC message which indicates or includes the PRS configuration information (e.g., 442). In some implementations, the PRS configuration message is sent to multiple UEs. In other implementations, the PRS configuration message is a PDCCH transmission, such as a DCI, or a MAC CE. Additionally, or alternatively, the PRS configuration message may schedule multiple PRS transmissions and/or reports (e.g., periodic or semi-static) or schedule/trigger a single PRS transmission and report (e.g., aperiodic).

At 615, the base station 105 sets an antenna configuration. For example, the antenna manager 440 of the base station 105 determines a new antenna configuration (e.g., 444) and switches from a first antenna configuration to a second (new) antenna configuration. The antenna configuration may include or be associated with multiple paths in some implementations. To illustrate, the antenna configuration may include multiple signal paths. Alternatively, the antenna configuration may include a single signal path. The antenna configuration may be received or determined locally at the base station 105. For example, the base station 105 may make one or more quality based determinations to determine whether or not to switch antenna configurations. The new antenna configuration may be used for a particular type of transmission, such as PRS transmissions only, or multiple types of transmissions.

The base station 105 may optionally determine to switch an antenna configuration. For example, the base station 105 (e.g., LMF thereof) may determine to switch an antenna configuration responsive to receiving a message from another device (e.g., the UE) or based on network determinations. The network determinations may include quality condition based determinations, position based determinations, etc., or a combination thereof.

At 620, the UE 115 transmits a PRS to the base station 105. For example, the PRS manager 415 of the UE 115 generates and transmits a PRS transmission 454 to the base station 105 for measurement operations. In some implementations, the PRS is sent to multiple devices, such as multiple UEs and/or base stations. In other implementations, the PRS is sent to a single device. Alternatively, another position RS may be used for position measurement operations.

At 625, the base station 105 performs a measurement operation on the PRS based on the switched antenna configuration. For example, the PRS manager 439 of the base station 105 processes and measures the PRS using the antenna configuration (e.g., 444) to generate measurement data 408. The base station 105 may measure or evaluate the PRS using a single signal path or multiple signal paths. Measuring or evaluating the PRS transmission for multiple signal paths may include determining multiple measurements for a single PRS transmission.

At 630, the base station 105 may optionally determine position information based on the measurement operation. For example, the base station 105 (e.g., a LMF thereof) may determine a position of the UE 115 based on the antenna configuration.

At 635, the base station 105 transmits a PRS report based on the PRS measurement operation. For example, the PRS manager 439 of the base station 105 generates and transmits a PRS report message 456 including an indication of the antenna configuration to UE 115. The PRS report 406 of the PRS report message 456 may be generated and transmitted based on the PRS configuration information. For example, the timing and structure of the PRS report may be determined based on the PRS configuration information. The PRS report message may include or correspond to a higher layer message, such as a layer 3 message. For example, the base station 105 generates a LPP message which includes the PRS measurement report. In other implementations, the PRS report is a PDCCH transmission, such as an downlink control information (DCI), a PDSCH transmission, or a MAC CE.

In some implementations, the base station 105 may additionally send the PRS report to one or more other devices, such as another UE, an anchor device, or another base station. Transmission of the PRS report to other devices is described further with reference to FIG. 7-9.

Additionally, or alternatively, the base station 105 may transmits the position information to the UE 115. The base station 105 may include the position information in the PRS report or in another message.

At 640, the UE 115 may transmit an uplink transmission based on the PRS report. For example, the UE 115 may use the antenna configuration of the PRS report to transmit a PUCCH or PUSCH transmission (e.g., 458) to the base station 105. Additionally or alternatively, the UE 115 may receive or determine a position (e.g., updated or more accurate position) of the base station 105, and may transmit a PUCCH or PUSCH transmission based on the position. For sidelink operations, the UE 115 may transmit a PSCCH or PSSCH transmission based on the PRS report and/or a determined position, or positioning assistance information, such as information which indirectly indicate the position (e.g., TOA/RTT).

Thus, in the example in FIG. 6, the devices perform network-based PRS operations for a network with a collocated architecture. That is, the network changes an antenna configuration and optionally reports the antenna configuration to the UE in a PRS report where the network is a combined base station with a LMF.

Figure 7:
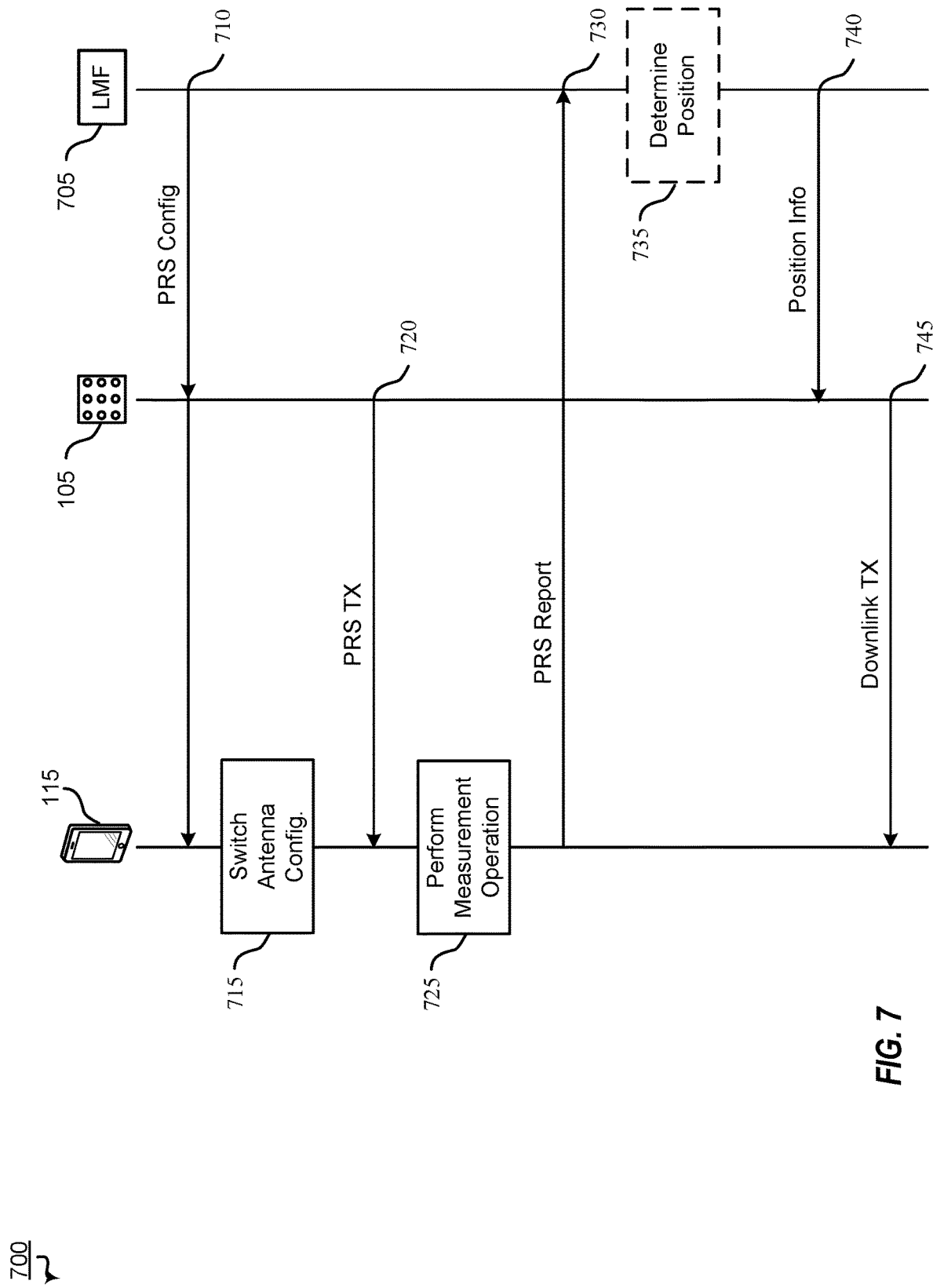
FIG. 7 is a ladder diagram illustrating another example wireless communication system that supports antenna configuration indication by PRS reports according to one or more aspects.

Referring to FIG. 7, FIG. 7 is a ladder diagram 700 of UE based PRS operations according to some aspects. In the example of FIG. 6, the ladder diagram illustrates a UE and multiple network entities, such as base station 105 and LMF 705. As compared to the ladder diagram of FIG. 5, the ladder diagram of FIG. 7 illustrates a network architecture where the base station 105 and LMF 705 are separate, that is not collocated.

At 710, the LMF 705 transmits PRS configuration information to the UE 115. For example, the LMF 705 generates and transmits a PRS configuration message 452 to the UE 115 which includes the PRS configuration information (e.g., 442). The PRS configuration information (e.g., 442) may include information for the PRS transmission itself, for a corresponding report, or both. The information may include settings, formats, transmission resources, etc. The PRS configuration message may include or correspond to a higher layer message, such as a layer 3 message. For example, the base station 105 generates a RRC message which indicates or includes the PRS configuration information. In some implementations, the PRS configuration message is sent to multiple UEs. In other implementations, the PRS configuration message is a PDCCH transmission, such as a DCI, or a MAC CE. Additionally, or alternatively, the PRS configuration message may schedule multiple PRS transmissions and/or reports (e.g., periodic or semi-static) or schedule/trigger a single PRS transmission and report (e.g., aperiodic).

Optionally, the LMF 705 also transmits the PRS configuration to one or more other devices, such as another UE, or a base station, such as base station 105 as illustrated in FIG. 7. Alternatively, in other implementations, the base station 105 may transmit the PRS configuration information to the UE 115 and optionally, the LMF 705.

At 715, the UE 115 set an antenna configuration. For example, the antenna manager 416 of the UE 115 determines a new antenna configuration and switches from a first antenna configuration to a second (new) antenna configuration. The antenna configuration may include multiple signal paths in some implementations. To illustrate, the antenna configuration may include multiple signal paths. Alternatively, the antenna configuration may include a single configuration and signal path. The antenna configuration may be received or determined locally at the UE. For example, a test request from the base station 105 or LMF 705 may indicate a particular antenna configuration (e.g., single path or multiple paths) for a particular PRS, as described further with reference to FIG. 9.

At 720, the base station 105 transmits a PRS to the UE 115. For example, the PRS manager 439 of the base station 105 generates and transmits a PRS transmission 454 to the UE 115 for measurement operations. In some implementations, the PRS is sent to multiple devices, such as multiple UEs. In other implementations, the PRS is sent to a single device. Alternatively, another position RS may be used for position measurement operations.

At 725, the UE 115 performs a measurement operation on the PRS based on the switched antenna configuration. For example, the PRS manager 415 of the UE 115 processes and measures the PRS using the antenna configuration (e.g., 444) to generate measurement data 408. The UE 115 may measure or evaluate the PRS using a single signal path or multiple signal paths.

At 730, the UE 115 transmits a PRS report based on the PRS measurement operation. For example, the PRS manager 415 of the UE 115 generates and transmits a PRS report message 456 including an indication of the antenna configuration to the LMF 705. The PRS report 406 of the PRS report message 456 may be generated and transmitted based on the PRS configuration information. For example, the timing and structure of the PRS report may be determined based on the PRS configuration information. The PRS report message may include or correspond to a higher layer message, such as a layer 3 message. For example, the base station 105 generates a LPP message which includes the PRS measurement report. In other implementations, the PRS report is a PUCCH transmission, such as an uplink control information (UCI), a PUSCH transmission, or a MAC CE. Additionally, or alternatively, the UE 115 transmits the PRS report message to the base station 105. Alternatively, for sidelink operations where the UE 115 receives a PRS from another UE, the PRS report may be a SCI or a MAC CE.

At 735, the LMF 705 may optionally determine position information based on the PRS report. For example, the base station 105 (e.g., a LMF thereof) may determine a position of the UE 115 based on the PRS report, including the antenna configuration indicated thereby, or may determine positioning assistance information.

At 740, the LMF 705 transmits the determined position information based on the PRS report. For example, the LMF 705 may transmit the position information or the positioning assistance information of the UE 115 based on the PRS report, including the antenna configuration indicated thereby, to the base station 105. Additionally, or alternatively, the LMF 705 may transmit the position information or the positioning assistance information of the UE 115 to the UE 115.

At 745, the base station 105 may transmit a downlink transmission based on the PRS report. For example, the base station 105 may use the antenna configuration indicated by the UE 115 to transmit a PDCCH or PDSCH transmission (e.g., 458). As another example, the base station 105 may use the determined position (e.g., updated or more accurate position) or the positioning assistance information of the UE 115 to transmit a PDCCH or PDSCH transmission.

Thus, in the example in FIG. 7, the devices perform UE-based PRS operations based on a distributed network architecture. That is, the UE reports antenna configuration information in a PRS report to a LMF which is separate from the base station.

Figure 8:
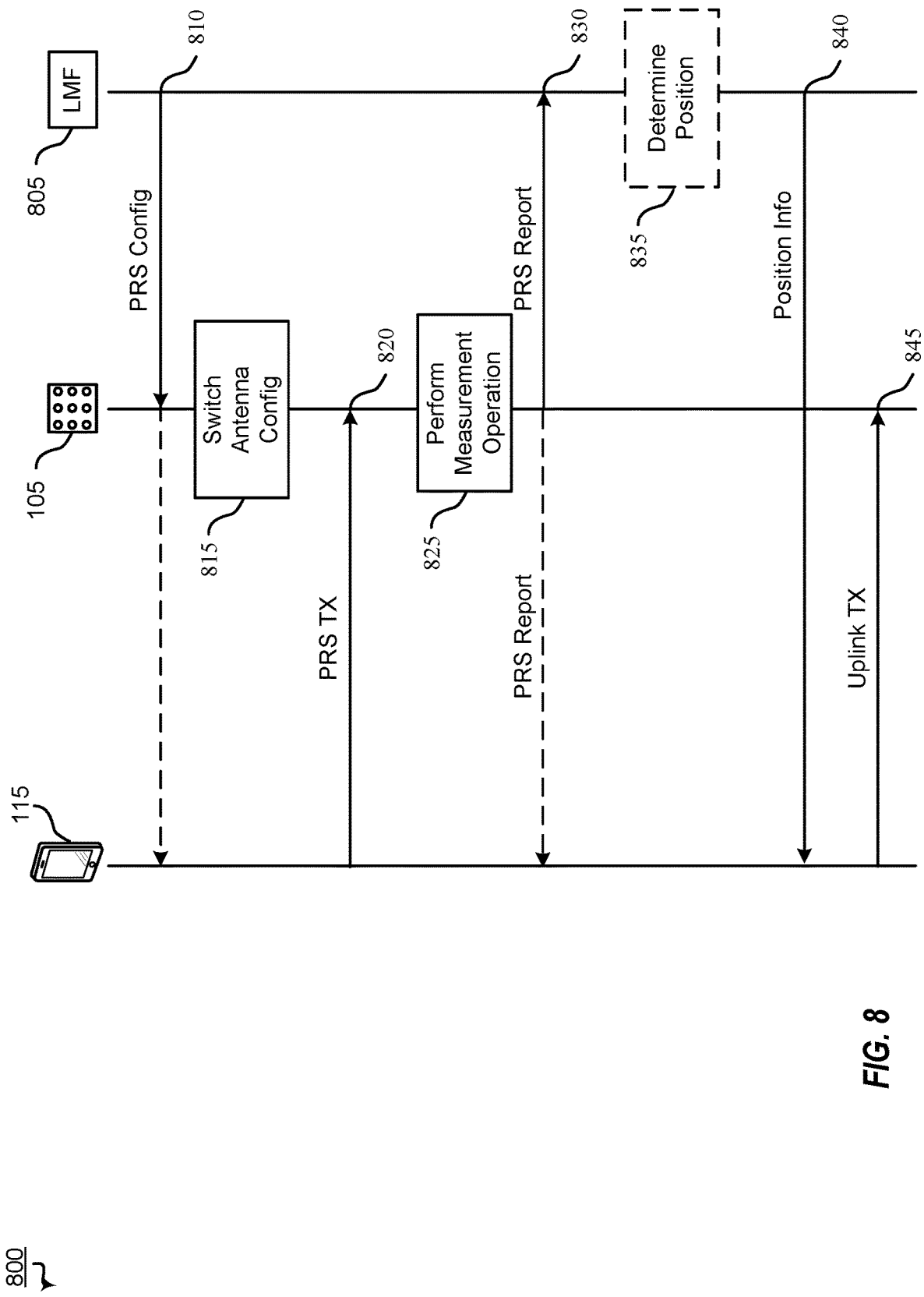
FIG. 8 is a ladder diagram illustrating another example wireless communication system that supports antenna configuration indication by PRS reports according to one or more aspects.

Referring to FIG. 8, FIG. 8 is a ladder diagram 800 of network based PRS operations according to some aspects. In the example of FIG. 8, the ladder diagram illustrates a UE and network entities, such as a base station 105 and a LMF 805. As compared to the network configuration in the ladder diagram of FIG. 6, the ladder diagram of FIG. 8 illustrates a network generated PRS report with antenna configuration information for a distributed network architecture.

At 810, the LMF 805 transmits PRS configuration information to the UE 115. For example, the PRS manager 439 of the base station 105 generates and transmits PRS configuration message 452 to the UE 115 which includes PRS configuration information (e.g., 442). The PRS configuration information (e.g., 442) may include information for the PRS transmission itself, for a corresponding report, or both. The information may include settings, formats, transmission resources, etc. The PRS configuration message may include or correspond to a higher layer message, such as a layer 3 message. For example, the base station 105 generates a RRC message which indicates or includes the PRS configuration information (e.g., 442). In some implementations, the PRS configuration message is sent to multiple UEs. In other implementations, the PRS configuration message is a PDCCH transmission, such as a DCI, or a MAC CE. Additionally, or alternatively, the PRS configuration message may schedule multiple PRS transmissions and/or reports (e.g., periodic or semi-static) or schedule/trigger a single PRS transmission and report (e.g., aperiodic).

Optionally, the LMF 805 also transmits the PRS configuration to one or more other devices, such as another UE (e.g., UE 115 as illustrated in FIG. 8) or a base station. Alternatively, in other implementations, the base station 105 may transmits the PRS configuration information to the UE 115 and optionally, the LMF 805.

At 815, the base station 105 sets an antenna configuration. For example, the antenna manager 440 of the base station 105 determines a new antenna configuration and switches from a first antenna configuration to a second (new) antenna configuration. The antenna configuration may include multiple signal paths in some implementations. To illustrate, the antenna configuration may include multiple antenna/signal paths. Alternatively, the antenna configuration may include a single configuration and signal path. The antenna configuration may be received or determined locally at the UE. For example, a test request from the LMF 805 may indicate a particular antenna configuration (e.g., single path or multiple paths) for a particular PRS, as described further with reference to FIG. 9.

The base station 105 may optionally determine to switch an antenna configuration. For example, the base station 105 may determine to switch an antenna configuration responsive to receiving a message from another device (e.g., the LMF 805) or based on network/base station determinations. The network/base station determinations may include quality condition based determinations, position based determinations, etc., or a combination thereof.

At 820, the UE 115 transmits a PRS to the base station 105. For example, the PRS manager 415 of the UE 115 generates and transmits a PRS transmission 454 to the base station 105 for measurement operations. In some implementations, the PRS is sent to multiple devices, such as multiple UEs and/or base stations. In other implementations, the PRS is sent to a single device. Alternatively, another RS may be used for position measurement operations.

At 825, the base station 105 performs a measurement operation on the PRS based on the switched antenna configuration. For example, the PRS manager 439 of the base station 105 processes and measures the PRS using the antenna configuration (e.g., 444) to generate measurement data 408. The base station 105 may measure or evaluate the PRS using a single signal path or multiple signal paths.

At 830, the base station 105 transmits a PRS report based on the PRS measurement operation. For example, the PRS manager 439 of the base station 105 generates and transmits a PRS report message 456 including an indication of the antenna configuration to the LMF 805, and optionally to the UE 115. The PRS report 406 of the PRS report message 456 may be generated and transmitted based on the PRS configuration information. For example, the timing and structure of the PRS report may be determined based on the PRS configuration information. The PRS report may include or correspond to a higher layer message, such as a layer 3 message. For example, the base station 105 generates a LPP message which includes or indicates the antenna configuration. In other implementations, the PRS report is a PDCCH transmission, such as an downlink control information (DCI), a PDSCH transmission, or a MAC CE. In some implementations, the base station 105 may additionally send the PRS report to one or more other devices, such as another UE, an anchor device, or another base station.

At 835, the LMF 805 may optionally determine position information based on the PRS report. For example, the LMF 805 may determine a position of the UE 115 based on the PRS report, including the antenna configuration indicated thereby, or may determine positioning assistance information.

At 840, the LMF 805 may transmit the determined position information. For example, the LMF 805 may transmit the position information or the positioning assistance information of the base station 105 based on the PRS report, including the antenna configuration indicated thereby, to the UE 115. Additionally, or alternatively, the LMF 805 may transmit the position information or the positioning assistance information of the base station 105 to the base station 105.

At 845, the UE 115 may transmit an uplink transmission based on the PRS report. For example, the UE 115 may use the antenna configuration of the PRS report to transmit a PUCCH or PUSCH transmission to the base station 105. Additionally or alternatively, the UE 115 may receive or determine a position (e.g., updated or more accurate position) of the base station 105, which was determined based on the PRS report, and may transmit a PUCCH or PUSCH transmission (e.g., 458) based on the position. To illustrate, the UE 115 may determine the position based on the positioning assistance information received from the LMF 805.

Thus, in the example in FIG. 8, the devices perform network-based PRS operations for a network with a distributed architecture. That is, the base station changes an antenna configuration and reports the antenna configuration to the network/LMF in a PRS report where the base station is separate from the network/LMF.

Figure 9:
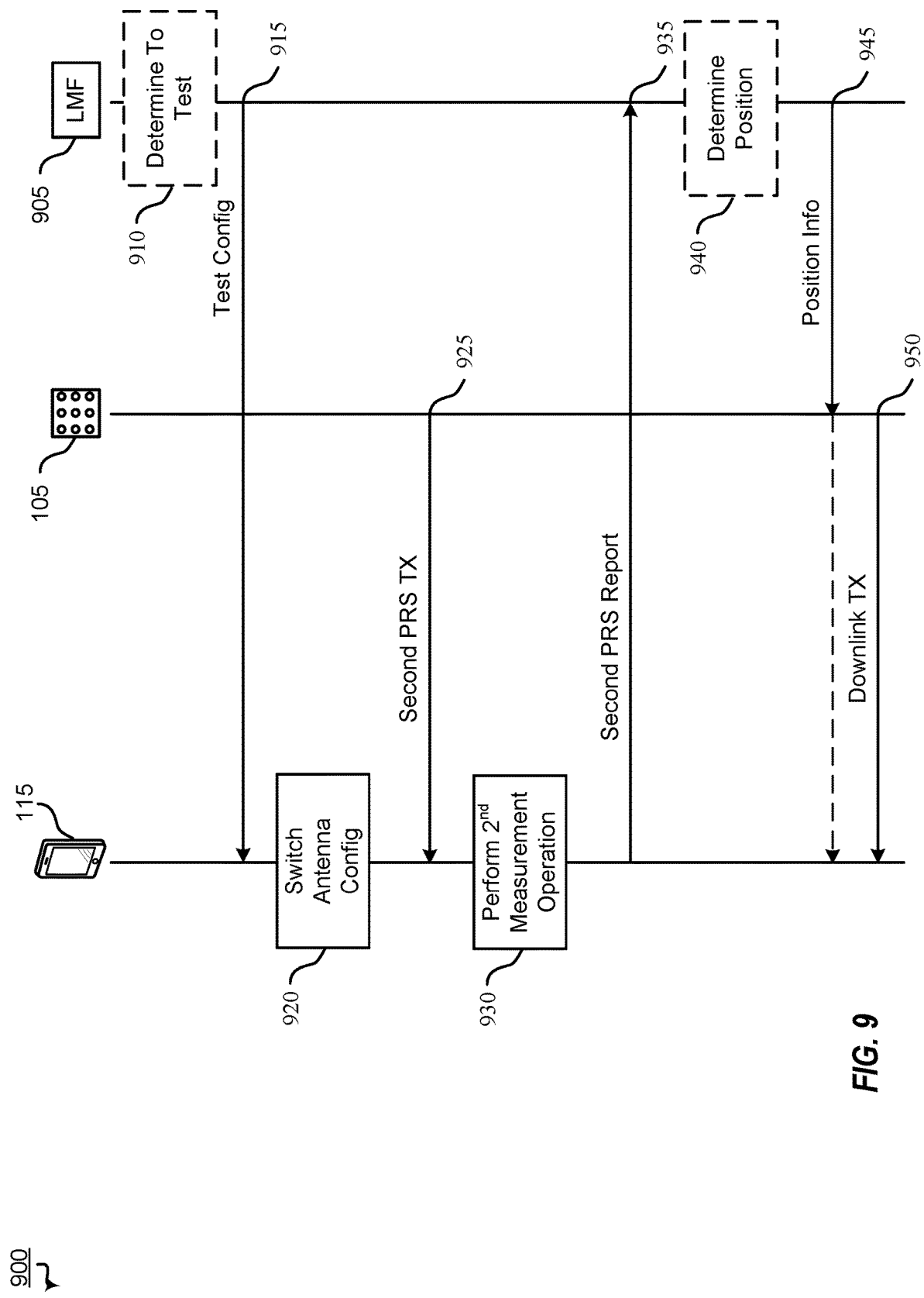
FIG. 9 is a ladder diagram illustrating another example wireless communication system that supports antenna configuration indication by PRS reports according to one or more aspects.

Referring to FIG. 9, FIG. 9 is a ladder diagram 900 of network based PRS operations according to some aspects. In the example of FIG. 9, the ladder diagram illustrates a UE and network entities, such as a base station 105 and a LMF 905. As compared to the network configuration in the ladder diagram of FIG. 5, the ladder diagram of FIG. 9 illustrates a UE generated PRS report with antenna configuration information for a distributed network architecture similar to FIG. 7.

At 910, the LMF 905 determines whether to test additional antenna configurations for one or more wireless communication devices. For example, the LMF 905 determines to test an addition antenna configuration for the UE 115.

At 915, the LMF 905 transmits a test configuration to the UE 115 For example, the LMF 905 determines to test an additional antenna configuration (e.g., 444) for the UE 115 and transmits a test configuration message indicating the antenna configuration (e.g., path or paths) to be tested.

At 920, the UE 115 switches antenna configurations. For example, the antenna manager 416 of the UE 115 determines a new antenna configuration based on the test configuration message and switches from an antenna configuration to the indicated antenna configuration. The antenna configuration may include multiple signal paths in some implementations. To illustrate, the antenna configuration may include multiple antenna/signal paths. Alternatively, the antenna configuration may include a single configuration and signal path.

At 925, the base station 105 transmits a PRS to the UE 115. For example, the PRS manager 439 of the base station 105 generates and transmits a PRS transmission 454 to the UE 115 for measurement operations. In some implementations, the PRS transmission is sent to multiple devices, such as multiple UEs and/or base stations. In other implementations, the PRS transmission is sent to a single device. Alternatively, another position RS may be used for position measurement operations.

At 930, the UE 115 performs a measurement operation on the PRS based on the indicated antenna configuration. For example, the PRS manager 415 of the UE 115 processes and measures the PRS using the antenna configuration (e.g., 444) indicated by the test configuration message to generate measurement data 408. The UE 115 may measure or evaluate the PRS using a single signal path or multiple signal paths.

At 935, the UE 115 transmits a PRS report based on the PRS measurement operation. For example, the PRS manager 415 of the UE 115 generates and transmits a PRS report message 456 including an indication of the antenna configuration to the LMF 905 and optionally the base station 105. The PRS report 406 of the PRS report message 456 may be generated and transmitted based on the PRS configuration information. For example, the timing and structure of the PRS report may be determined based on the PRS configuration information. The PRS report message may include or correspond to a higher layer message, such as a layer 3 message. For example, the base station 105 generates a LPP message which includes or indicates the antenna configuration. In other implementations, the PRS report is a PUCCH transmission, such as an uplink control information (UCI), a PUSCH transmission, or a MAC CE. Alternatively, for sidelink operations where the UE 115 receives a PRS from another UE, the PRS report may be a SCI or a MAC CE. In some implementations, the UE 115 may additionally send the PRS report to one or more other devices, such as another UE, an anchor device, or another base station.

At 940, the LMF 905 may optionally determine position information based on the PRS report. For example, the LMF 905 may determine a position of the UE 115 or positioning assistance information based on the PRS report, including the antenna configuration indicated thereby.

At 945, the LMF 905 may transmit the determined position information. For example, the LMF 905 may determine a position of or positioning assistance information for the base station 105 and/or UE 115 based on the PRS report, including the antenna configuration indicated thereby, and transmit the position to the base station 105. Additionally, or alternatively, may determine a position of or positioning assistance information for the base station 105 and/or UE 115 based on the PRS report, including the antenna configuration indicated thereby, and transmit the position to the UE 115, as illustrated by the dashed line in FIG. 9.

At 950, the base station 105 may transmit a downlink transmission based on the PRS report. For example, the base station 105 may use the antenna configuration of the PRS report to transmit a PDCCH or PDSCH transmission (e.g., 458) to the UE 115. Additionally or alternatively, the base station 105 may receive or determine a position (e.g., updated or more accurate position) of the base station 105, which was determined based on the PRS report, and may transmit a PDCCH or PDSCH transmission based on the position.

Thus, in the example in FIG. 9, the devices perform test configuration operations for PRS antenna configuration feedback. That is, a network device may determine one or more antenna configurations for a device to test, and the network device (e.g., LMF) instructs the device to test the configuration(s) during one or more subsequent PRS transmissions.

Additionally, or alternatively, one or more operations of FIGS. 4-9 may be added, removed, substituted in other implementations. For example, in some implementations, the example steps of FIGS. 5 and 6 may be used together. To illustrate, the UE/uplink operations of FIG. 5 may be used with the network/downlink operations of FIG. 6. As another example, the example steps of FIGS. 7 and 8 may be used together. To illustrate, the UE/uplink operations of FIG. 7 may be used with the network/downlink operations of FIG. 8. In some such implementations, a round trip time (RTT) positioning determination may be used. As yet another example, some of the steps of FIG. 9 may be used with any of FIGS. 4-8. To illustrate, the test configuration operations of FIG. 9 may be used in addition to or in place of the position determination operations of FIGS. 4-8.

Figures 10, 11:
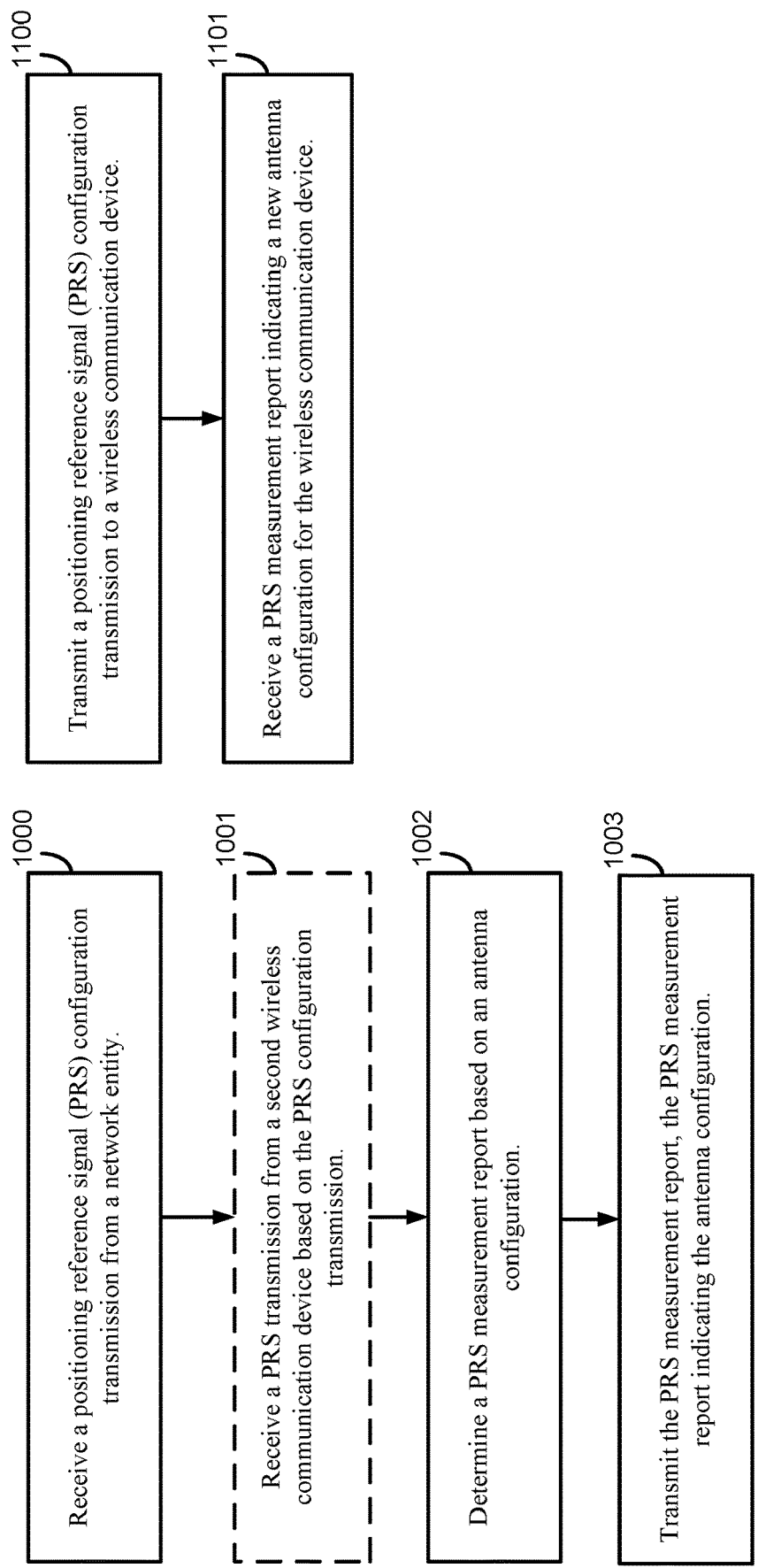
FIG. 10 is a flow diagram illustrating an example process that supports antenna configuration indication by PRS reports according to one or more aspects.
FIG. 11 is a flow diagram illustrating another example process that supports antenna configuration indication by PRS reports according to one or more aspects.
Figure 12:
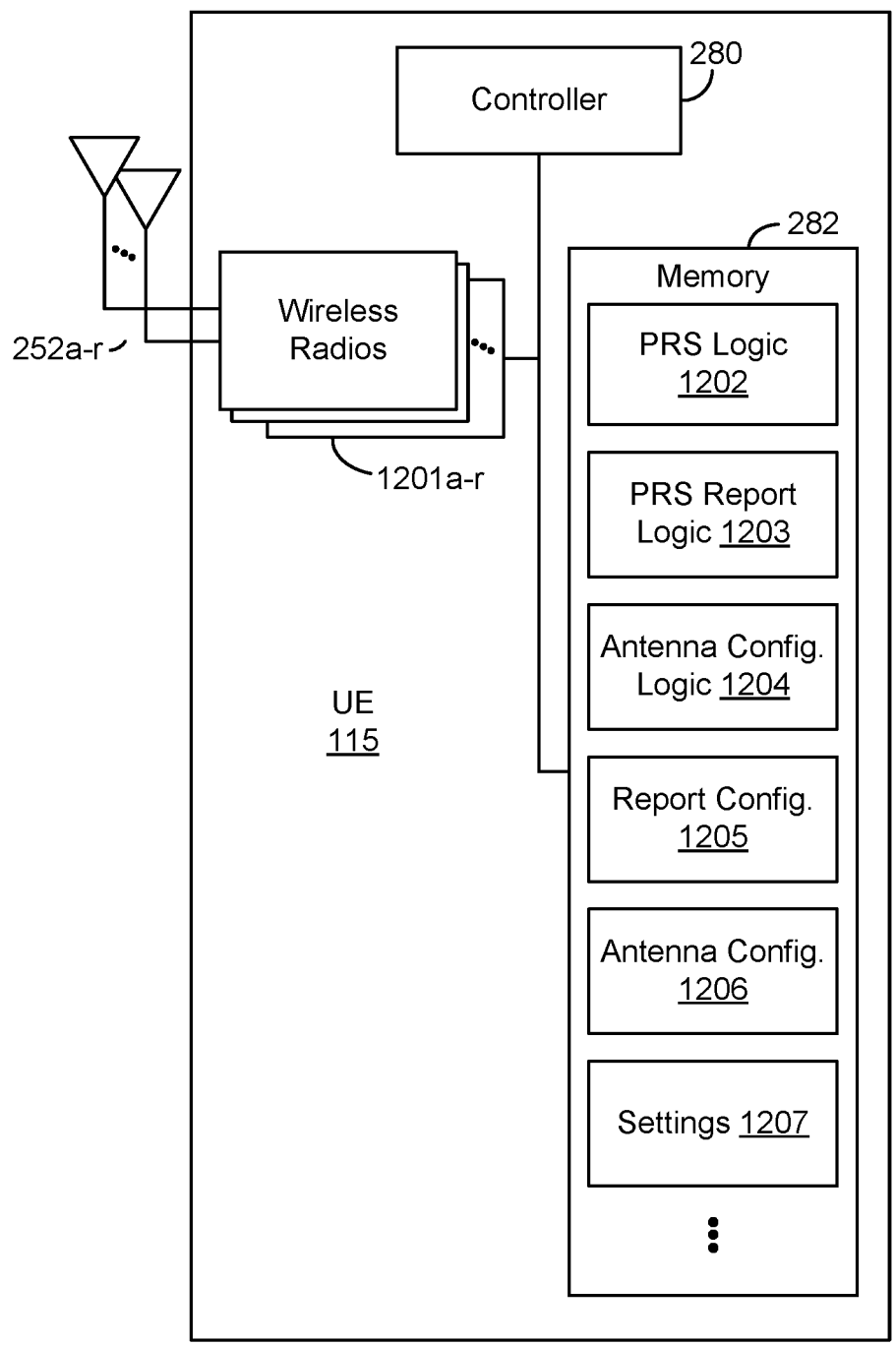
FIG. 12 is a block diagram of an example UE that supports antenna configuration indication by PRS reports according to one or more aspects.

FIG. 10 is a flow diagram illustrating example blocks executed by a wireless communication device (e.g., UE or base station) configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1201a-r and antennas 252a-r. Wireless radios 1201a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 12, memory 282 stores PRS logic 1202, PRS Report logic 1203, Antenna Configuration Logic 1204, Report Configuration data 105, Antenna Configuration data 1206, and settings data 1207.

PRS logic 1202 may include or correspond to PRS manager 415, 439 and may be configured to PRS manager 415, 439 and FIG. 4. For example, the PRS logic 1202 may determine resources for PRS transmission and/or feedback, PRS feedback settings, perform PRS measurement operations, or a combination thereof.

PRS report logic 1203 may include or correspond to PRS manager 415, 439 and may be configured to PRS manager 415, 439 and FIG. 4. For example, the PRS Report logic 1203 may generate and transmit a PRS report which indicates the antenna configuration used to measure the PRS transmission.

Antenna configuration logic 1204 may include or correspond to Antenna manager 416, 440 and may be configured to perform one or more operations as described with reference to Antenna manager 416, 440 and FIG. 4. For example, the Antenna Configuration logic 1204 may determine to use a new antenna configuration and switch antenna configurations.

Report Configuration data 1205 may include or correspond to PRS report data 406. Antenna Configuration data 1206 may include or correspond to antenna settings data 444. Settings data 1207 may include or correspond to PRS settings data 442.

At block 1000, a wireless communication device, such as a UE or base station, receives a positioning reference signal (PRS) configuration transmission from a network entity. For example, the UE 115 receives a PRS configuration transmission 452 from a LMF 705, 805, 905 using wireless radios 1201a-r and antennas 252a-r, as described with reference to FIGS. 4-9. The PRS configuration transmission may include or correspond to a RRC transmission. The LMF may be separate from a base station or collocated with a base station.

The UE 115 optionally sets an antenna configuration for a PRS transmission. For example, the antenna manager 416 of the UE 115 sets a new antenna configuration or parameter for an upcoming PRS transmission scheduled by the PRS configuration transmission, as described with reference to FIGS. 4-9. To illustrate, the antenna manager 416 of the UE 115 may switch antenna panels (e.g., from a first panel to a second panel) used to receive and/or process the PRS transmission. The antenna manager 416 of the UE 115 may determine this new configuration based on UE determinations or based on a received message (e.g., test configuration message) from another device. The antenna configuration may include a beam width parameter, a sub-array parameter, an array parameter, a panel parameter, or a combination thereof.

At block 1001, the UE 115 may receive the PRS transmission from a second wireless communication device based on the PRS configuration transmission. For example, the UE 115 receives the PRS transmission 454 from a base station 105 using wireless radios 1201a-r and antennas 252a-r. based on a transmission resource indicated by the PRS configuration transmission, as described with reference to FIGS. 4-9. The PRS manager 415 and/or PRS logic 1202 of the UE 115 may determine the transmission resource indicated by the PRS configuration transmission 452.

At block 1002, the UE 115 determines a PRS measurement report based on an antenna configuration. For example, the UE 115 performs a measurement operation on the PRS transmission based on the antenna configuration. To illustrate, the PRS manager 415 and/or PRS logic 1202 of the UE 115 performs a measurement operation on the PRS transmission 454 using the antenna configuration PRS logic 1302, as described with reference to FIGS. 4-9. In some aspects, the UE 115 may perform a tracking loop measurement operation on the PRS transmission. Determining the PRS measurement report based on the antenna configuration may further include generating the PRS measurement report based on the measurement operation (or operations).

In some implementations, the UE 115 may use a group delay associated with the antenna configuration to shift the timing/PRS measurements to generate measurements for the antenna configuration during reception of the PRS transmission 454. The measurements may be included in or indicated by the PRS report of the report transmission 456. Such measurements may enable generation of a more accurate ranging estimate by the UE 115 or another device.

In other implementations, the UE 115 may use a group delay associated with the antenna configuration after reception of the PRS transmission 454. For example, the UE 115 may use the group delay associated with the antenna configuration after the PRS transmission 454 is received and/or measured with another antenna configuration to adjust the measurements or a ranging estimate determined based on the measurements. Thus, to measure the PRS transmission based on the antenna configuration the UE 115 can use the antenna configuration to receive the PRS transmission and generate measurements, or the UE 115 may adjust measurements associated with another antenna configuration based on the antenna configuration.

At block 1003, the UE 115 transmits the PRS measurement report indicating the antenna configuration. For example, the UE 115 transmits a PRS measurement report 456 which indicates or includes the antenna configuration (e.g., 444/1206) using wireless radios 1201a-r and antennas 252a-r, as described with reference to FIGS. 4-9. The PRS measurement report 456 may be generated by PRS report logic 1203 and/or PRS manager 415, 439. The PRS measurement report may include or correspond to a LPP transmission. Alternatively, the PRS measurement report may include or correspond to a DCI, a UCI, a SCI, or a MAC CE transmission. The PRS measurement report may include or indicate antenna type information, antenna placement information, beam width information, or a combination thereof.

The wireless communication device (e.g., UE or base station) may execute additional blocks (or the wireless communication device may be configured further perform additional operations) in other implementations. For example, the UE 115 may perform one or more operations described above. As another example, the UE 115 may perform one or more aspects as presented below.

In one or more aspects, techniques for supporting enhanced PRS feedback operations may include additional aspects, such as any single aspect or any combination of aspects described below or in connection with one or more other processes or devices described elsewhere herein. In one or more aspects, supporting enhanced PRS feedback operations may include an apparatus configured to receive a positioning reference signal (PRS) configuration transmission from a network entity; receive a PRS transmission from a second wireless communication device based on the PRS configuration transmission; perform a measurement operation on the PRS transmission based on an antenna configuration; and transmit a PRS measurement report based on the measurement operation, the PRS measurement report indicating the antenna configuration. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the UE generates the report the PRS measurement report based on the measurement operation and the antenna configuration.

In a second aspect, alone or in combination with the first aspect, the UE receives a communication from the second wireless device, the communication transmitted based on a positioning information derived from the PRS measurement report.

In a third aspect, alone or in combination with one or more of the above aspects, the PRS measurement report is transmitted to the network entity, and the UE further: receives a test request from the network entity responsive to the PRS measurement report, the test request indicating a second antenna configuration; receive, a second PRS transmission from the second wireless communication device based on the PRS configuration transmission; performs a second measurement operation on the second PRS transmission based on the second antenna configuration; and transmit a second PRS measurement report based on the second measurement operation.

In a fourth aspect, alone or in combination with one or more of the above aspects, the PRS configuration transmission is a RRC transmission, and wherein multiple PRS transmissions are scheduled by the RRC transmission.

In a fifth aspect, alone or in combination with one or more of the above aspects, the wireless communication device is a UE, and wherein the second wireless communication device is a base station or another UE.

In a sixth aspect, alone or in combination with one or more of the above aspects, the wireless communication device is a base station, and wherein the second wireless communication device is a UE.

In a seventh aspect, alone or in combination with one or more of the above aspects, the network entity is a location management function (LMF).

In an eighth aspect, alone or in combination with one or more of the above aspects, the LMF is collocated with the base station.

In a ninth aspect, alone or in combination with one or more of the above aspects, the PRS measurement report is a UCI transmission or a SCI transmission.

In a tenth aspect, alone or in combination with one or more of the above aspects, the PRS measurement report is a DCI transmission.

In an eleventh aspect, alone or in combination with one or more of the above aspects, the PRS measurement report is a MAC CE transmission.

In a twelfth aspect, alone or in combination with one or more of the above aspects, the PRS measurement report is a LTE Positioning Protocol (LPP) message.

In a thirteenth aspect, alone or in combination with one or more of the above aspects, the UE optionally maintains the antenna configuration; receives a second PRS transmission from the second wireless communication device based on the PRS configuration transmission; performs a second measurement operation on the second PRS transmission based on the antenna configuration; generates a second PRS measurement report indicating the antenna configuration; and transmits a second PRS measurement report based on the second measurement operation, the second PRS measurement report indicating the antenna configuration.

In a fourteenth aspect, alone or in combination with one or more of the above aspects, the UE: optionally maintains the antenna configuration; receives a second PRS transmission from the second wireless communication device based on the PRS configuration transmission; performs a second measurement operation on the second PRS transmission based on the antenna configuration; generates a second PRS measurement report by refraining from including the antenna configuration; and transmits a second PRS measurement report based on the second measurement operation, the second PRS measurement report not indicating the antenna configuration.

In a fifteenth aspect, alone or in combination with one or more of the above aspects, performing the measurement operation on the PRS transmission includes conducting one measurement for one antenna configuration.

In a sixteenth aspect, alone or in combination with one or more of the above aspects, performing the measurement operation on the PRS transmission includes conducting a plurality of measurements for a plurality of signal paths of the antenna configuration, each measurement for a corresponding signal path.

In a seventeenth aspect, alone or in combination with one or more of the above aspects, the antenna configuration includes a beam width parameter, a sub-array parameter, an array parameter, a panel parameter, or a combination thereof.

In an eighteenth aspect, alone or in combination with one or more of the above aspects, the PRS measurement report (e.g., antenna configuration information thereof) includes antenna type information, antenna placement information, and beam width information.

In a nineteenth aspect, alone or in combination with one or more of the above aspects, the PRS measurement report includes or corresponds to a UE capability report (e.g., ProvideCapabilities message).

In a twentieth aspect, alone or in combination with one or more of the above aspects, the PRS measurement report includes or corresponds to a request location information message. Alternatively, the PRS measurement report includes or corresponds a Request Assistance Data message (e.g., RequestAssistanceData message).

In a twenty-first aspect, alone or in combination with one or more of the above aspects, the PRS measurement report includes or corresponds to a Provide Location Information message (e.g., ProvideLocationInformation message).

In a twenty-second aspect, alone or in combination with one or more of the above aspects, the UE determines the antenna configuration and sets the antenna configuration for the PRS transmission. The antenna configuration is used to receive the PRS transmission and generate PRS measurements; the PRS measurements are indicated by the PRS measurement report and associated with the antenna configuration.

In a twenty-third aspect, alone or in combination with one or more of the above aspects, performing the measurement operation on the PRS transmission based on the antenna configuration includes: generating, by the wireless communication device, PRS measurements during reception of the PRS transmission; and adjusting, by the wireless communication device, the PRS measurements based on a group delay associated with the antenna configuration to generate shifted PRS measurements, wherein the shifted PRS measurements are indicated by the PRS measurement report.

In a twenty-fourth aspect, alone or in combination with one or more of the above aspects, performing the measurement operation on the PRS transmission based on the antenna configuration includes: generating, by the wireless communication device, PRS measurements during reception of the PRS transmission; adjusting, by the wireless communication device, the PRS measurements based on a group delay associated with the antenna configuration to generate shifted PRS measurements; and adjusting, by the wireless communication device, a ranging estimate based on the shifted PRS measurements, wherein the ranging estimate is indicated by the PRS measurement report.

In a twenty-fifth aspect, alone or in combination with one or more of the above aspects, the UE: receives a message indicating position assistance information, the position assistance information determined based on the new antenna configuration indicated by the PRS measurement report; determines positioning information based on the position assistance information; and transmits a communication based on the positioning information.

In a twenty-sixth aspect, alone or in combination with one or more of the above aspects, the UE: transmits a second PRS transmission to the second wireless communication device; and receives, from the second wireless communication device, a second PRS measurement report responsive to the second PRS transmission, the second PRS measurement report indicating a new antenna configuration for the second wireless communication device.

In a twenty-seventh aspect, alone or in combination with one or more of the above aspects, the UE: receives a second PRS transmission from the second wireless communication device based on the PRS configuration transmission; performs a measurement operation (e.g., second measurement operation) on the second PRS transmission based on the antenna configuration; determines to use the antenna configuration based on the measurement operation; and refrains from transmitting a second PRS measurement report based on determining to keep using the antenna configuration (e.g., not change the antenna configuration). In some aspects, the UE may only generate and transmit a PRS report when an antenna configuration has changed.

Accordingly, a wireless communication devices may perform enhanced PRS feedback operations. By performing enhanced PRS feedback operations, throughput and reliability may be increased and such operations may enable enhancements in position estimation operations and/or with advanced wireless devices (e.g., devices with distributed antennas).

Figure 13:
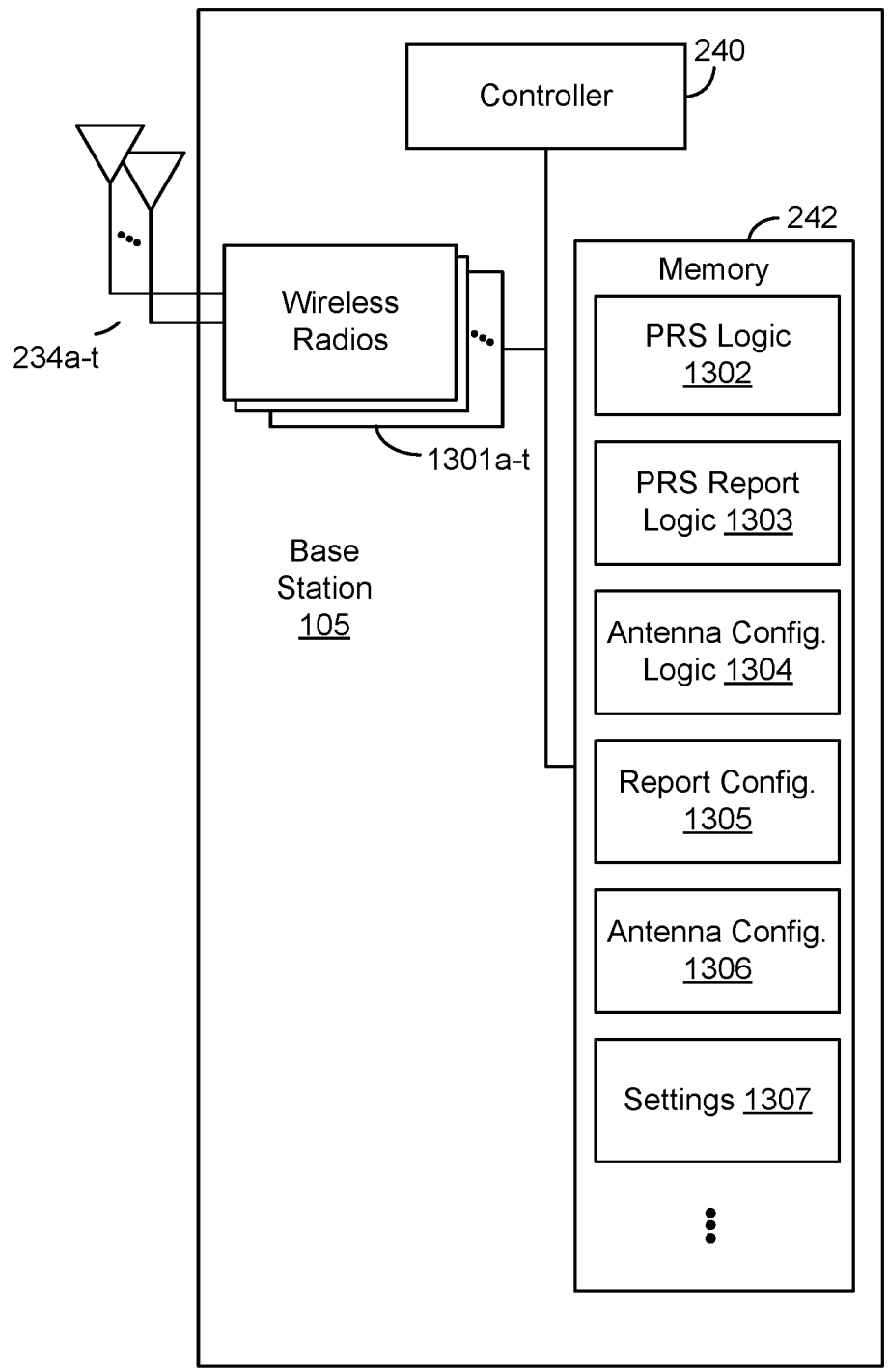
FIG. 13 is a block diagram of an example base station that supports antenna configuration indication by PRS reports according to one or more aspects.

FIG. 11 is a flow diagram illustrating example blocks executed by a wireless communication device (e.g., UE or network entity, such as a base station or LMF) configured according to an aspect of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1301a-t and antennas 234a-t. Wireless radios 1301a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 13, memory 282 stores PRS logic 1302, PRS Report logic 1303, Antenna Configuration Logic 1304, Report Configuration data 1305, Antenna Configuration data 1306, and settings data 1307.

PRS logic 1302 may include or correspond to PRS manager 415, 439 and may be configured to PRS manager 415, 439 and FIG. 4. For example, the PRS logic 1302 may determine resources for PRS transmission and/or feedback, PRS feedback settings, perform PRS measurement operations, or a combination thereof.

PRS report logic 1303 may include or correspond to PRS manager 415, 439 and may be configured to PRS manager 415, 439 and FIG. 4. For example, the PRS Report logic 1303 may generate and transmit a PRS report which indicates the antenna configuration used to measure the PRS transmission.

Antenna Configuration logic 1304 may include or correspond to Antenna manager 416, 440 and may be configured to perform one or more operations as described with reference to Antenna manager 416, 440 and FIG. 4. For example, the Antenna Configuration logic 1304 may determine to use a new antenna configuration and switch antenna configurations.

Report Configuration data 1305 may include or correspond to PRS report data 406. Antenna Configuration data 1306 may include or correspond to antenna settings data 444. Settings data 1307 may include or correspond to PRS settings data 442.

At block 1100, a wireless communication device, such as a base station 105, LMF 705-905, or a UE 115, transmits positioning reference signal (PRS) configuration transmission to a wireless communication device. For example, the base station 105 transmits PRS configuration transmission 452 to a UE 115 using wireless radios 1301*a-t* and antennas 234*a-t*, as described with reference to FIGS. 4-9. The PRS manager 440 and/or PRS logic 1302 of the base station 105 may generate the PRS configuration transmission 452. Alternatively, an LMF of the base station 105 may generate the PRS configuration transmission 452. The PRS configuration transmission may include or correspond to a PSCCH transmission and/or a PSSCH transmission from another UE.

At block 1101, the base station 105 receives a PRS measurement report indicating a new antenna configuration for the wireless communication device. For example, the base station 105 receives, from a UE 115, a PRS measurement report 456 indicating a new antenna configuration (e.g., 444/1306) for the UE 115 using wireless radios 1301*a-t* and antennas 234*a-t*, as described with reference to FIGS. 4-9. To illustrate, the PRS manager 440 and/or PRS logic 1302 of the base station 105 may determine an antenna configuration from an indicator (e.g., antenna configuration index) or from an included configuration or antenna parameter in the PRS measurement report. The antenna configuration may include a beam width parameter, a sub-array parameter, an array parameter, a panel parameter, or a combination thereof. The PRS measurement report may include or indicate antenna type information, antenna placement information, and beam width information.

The PRS measurement report may include or correspond to a UE capability report, a Request Assistance Data message, or a Provide Location Information message. Additionally, or alternatively, the PRS measurement report may include or correspond to a DCI, UCI, SCI, MAC CE.

The network entity (e.g., base station 105 or LMF 705-905) may execute additional blocks (or the network entity may be configured further perform additional operations) in other implementations. For example, the base station 105 may perform one or more operations described above. As another example, the base station 105 may perform one or more aspects as presented below.

In one or more aspects, techniques for supporting enhanced PRS feedback operations may include additional aspects, such as any single aspect or any combination of aspects described below or in connection with one or more other processes or devices described elsewhere herein. In one or more aspects, supporting enhanced PRS feedback operations may include an apparatus configured to transmit a positioning reference signal (PRS) configuration transmission to a wireless communication device; and receive, from the wireless communication device, a PRS measurement report indicating a new antenna configuration for the wireless communication device. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a first aspect, the network entity (e.g., base station or LMF) determines positioning assistance information for the wireless communication device based on the new antenna configuration indicated by the PRS measurement report; and transmits a message indicating the position assistance information to a second wireless communication device.

In a second aspect, alone in combination with the first aspect, the positioning assistance information indicates a location (e.g., coordinates) of the wireless communication device, a timing delay associated with the wireless communication device, which antenna panel is more accurate, which antenna panel has less calibration error, or a combination thereof.

In a third aspect, alone in combination with one or more of the above aspects, the network entity: determines second antenna configuration for the wireless communication device based on the PRS measurement report; transmits a test request responsive to the PRS measurement report, the test request indicating the second antenna configuration for the wireless communication device; and receives a second PRS measurement report based on the second antenna configuration.

In a fourth aspect, alone in combination with one or more of the above aspects, the network entity transmits a PRS transmission to the wireless communication device based on the PRS configuration transmission.

In a fifth aspect, alone in combination with one or more of the above aspects, the network entity: transmits a communication to the wireless device, the communication transmitted based on a positioning information derived from the PRS measurement report.

In a sixth aspect, alone in combination with one or more of the above aspects, the PRS configuration transmission is a RRC transmission, and wherein multiple PRS transmissions are scheduled by the RRC transmission.

In a seventh aspect, alone in combination with one or more of the above aspects, the network entity is a base station, and wherein the wireless communication device is a UE.

In an eighth aspect, alone in combination with one or more of the above aspects, the network entity is a location management function (LMF).

In a ninth aspect, alone in combination with one or more of the above aspects, the LMF is collocated with a base station.

In a tenth aspect, alone in combination with one or more of the above aspects, the PRS measurement report is a UCI transmission or a SCI transmission.

In an eleventh fourth aspect, alone in combination with one or more of the above aspects, the PRS measurement report is a DCI transmission.

In a twelfth aspect, alone in combination with one or more of the above aspects, the PRS measurement report is a MAC CE transmission.

In a thirteenth aspect, alone in combination with one or more of the above aspects, the PRS measurement report is a LTE Positioning Protocol (LPP) message.

In a fourteenth aspect, alone in combination with one or more of the above aspects, the network entity: transmits a second PRS transmission based on the PRS configuration transmission; and receives a second PRS measurement report responsive to the second PRS transmission, the second PRS measurement report indicating the antenna configuration.

In a fifteenth aspect, alone in combination with one or more of the above aspects, the network entity: transmits a second PRS transmission based on the PRS configuration transmission; and receives a second PRS measurement report responsive to the second PRS transmission, the second PRS measurement report not indicating the antenna configuration.

In a sixteenth aspect, alone in combination with one or more of the above aspects, the network entity: receives a second PRS transmission from the wireless communication device; performs a second measurement operation on the second PRS transmission; and transmits a second PRS measurement report based on the second measurement operation, the second PRS measurement report indicating a new antenna configuration for the network entity.

In a seventeenth aspect, alone in combination with one or more of the above aspects, the network entity: determines the new antenna configuration.

In an eighteenth aspect, alone in combination with one or more of the above aspects, performing the second measurement operation on the second PRS transmission includes conducting one measurement for one antenna configuration.

In a nineteenth aspect, alone in combination with one or more of the above aspects, performing the second measurement operation on the second PRS transmission includes conducting a plurality of measurements for a plurality of signal paths of the new antenna configuration, each measurement for a corresponding signal path.

In a twentieth aspect, alone in combination with one or more of the above aspects, the antenna configuration includes a beam width parameter, a sub-array parameter, an array parameter, a panel parameter, or a combination thereof.

In a twenty-first aspect, alone in combination with one or more of the above aspects, the PRS measurement report includes antenna type information, antenna placement information, and beam width information.

In a twenty-second aspect, alone in combination with one or more of the above aspects, the PRS measurement report includes or corresponds to a UE capability report.

In a twenty-third aspect, alone in combination with one or more of the above aspects, the PRS measurement report includes or corresponds to a Request Assistance Data message.

In a twenty-fourth aspect, alone in combination with one or more of the above aspects, the PRS measurement report includes or corresponds to a Provide Location Information message.

Accordingly, a wireless communication devices may perform enhanced PRS feedback operations. By performing enhanced PRS feedback operations, throughput and reliability may be increased and such operations may enable enhancements in position estimation operations and/or with advanced wireless devices (e.g., devices with distributed antennas).

Figure 14:
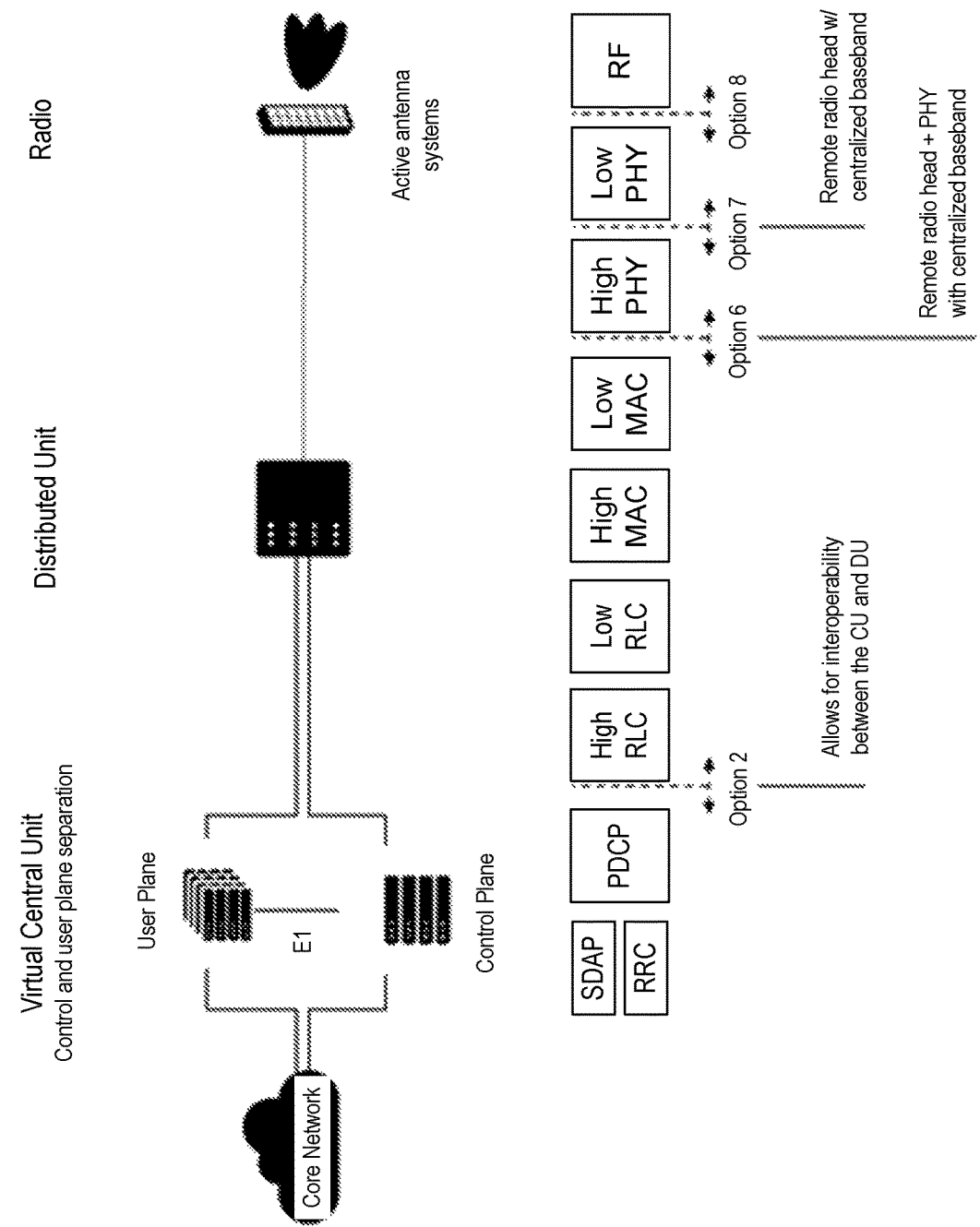
FIGS. 14 and 15 illustrate block diagrams of disaggregated RAN type networks.
Figure 15:
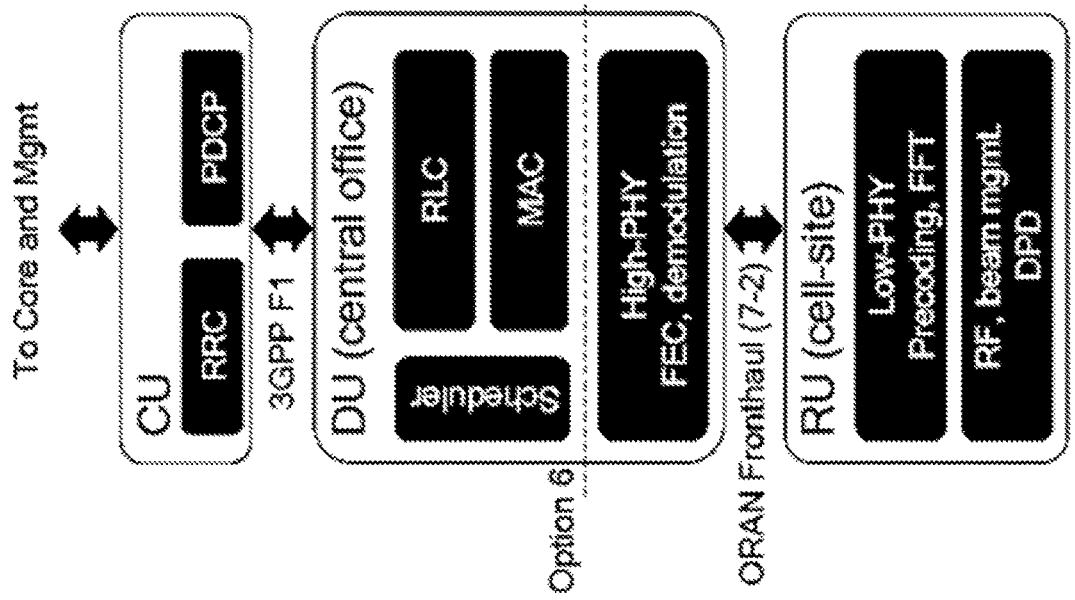

FIGS. 14 and 15 illustrate block diagrams of disaggregated RAN type networks. The aspects herein may be utilized with traditional RANs or with disaggregated RANs (also referred to as Open RAN). In a traditional RAN, a core, a baseband unit, and a radio head (RH) are designed as integrated software/hardware. In a Disaggregated RAN, the RAN structure is flexible and individual parts or components of the RAN may be comprised in different devices, different locations, and/or virtualized, such as illustrated in diagram 1400 of FIG. 14 and 1500 of FIG. 15. For example, different layers may be split apart, between the components (e.g., CU, DU, and RU) of the Disaggregated RAN. Examples of such splitting between layers may include splitting layers between RAN components after the PDCP layer, after the lower MAC layer, after the high physical layer, and/or after the low physical layer, as illustrated as options 2, 6, 7, and 8 in FIG. 14 and as option 6 in FIG. 15.

In a particular Disaggregated RAN structure, a central unit (CU) may be associated with (e.g., have control of) multiple distributed units (DUs) and be associated with (e.g., have control of) multiple radio units (also referred to as remote radio units, RU). The CU may include higher layer, such as RRC and PDCP layers, logic and control such operations. The DUs may include lower layer, such as RLC, MAC, and upper physical layer, logic and control such operations. The RUs may include other lower layer, such as physical layer, logic and control such operations. To illustrate, the DUs may handle layer 2 (e.g., MAC) functionality, and the CU or CUs control beam and panel (e.g., RU) selection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
receiving, by a wireless communication device, a positioning reference signal (PRS) configuration transmission from a network entity;
switching an antenna configuration of the wireless communication device;
receiving, by the wireless communication device using the switched antenna configuration, a PRS transmission from a second wireless communication device based on the PRS configuration transmission;
performing, by the wireless communication device, a measurement operation on the PRS transmission based on the switched antenna configuration;
determining, by the wireless communication device, a PRS measurement report including an indication of the switched antenna configuration based on the measurement operation; and
transmitting, by the wireless communication device, the PRS measurement report including the indication of the switched antenna configuration.

2. The method of claim 1, further comprising:
receiving, by the wireless communication device, a message indicating positioning assistance information from the second wireless communication device and based on the transmission of the PRS measurement report including the indication of the switched antenna configuration, wherein the positioning assistance information indicates a location of the wireless communication device, a timing delay associated with the wireless communication device, which antenna panel is more accurate, which antenna panel has less calibration error, or a combination thereof.

3. The method of claim 1, further comprising:
performing, by the wireless communication device, multiple measurement operations on a PRS transmission received from a second wireless communication device based on multiple antenna configurations including the antenna configuration, each antenna configuration corresponding to an antenna configuration of an antenna panel of the wireless communication device;
generating, by the wireless communication device, multiple PRS measurement reports, including the PRS measurement report, based on the measurement operations and the multiple antenna configurations; and
transmitting, by the wireless communication device, the multiple PRS measurement reports including the PRS measurement report, the multiple PRS measurement report indicating the antenna configuration.

4. The method of claim 1, wherein the PRS measurement report is transmitted to the network entity, and further comprising:
receiving, by the wireless communication device, a request from the network entity responsive to the PRS measurement report, the request indicating a second antenna configuration;
performing, by the wireless communication device, a measurement operation on a second PRS signal based on the second antenna configuration; and
transmitting, by the wireless communication device, a second PRS measurement report based on the measurement operation.

5. The method of claim 1, wherein the wireless communication device is a UE or a base station.

6. The method of claim 1, wherein the PRS measurement report is a UCI transmission, a sidelink control information (SCI) transmission, a downlink control information (DCI) transmission, a medium access control control element (MAC CE) transmission, or a Long Term Evolution (LTE) Positioning Protocol (LPP) message.

7. The method of claim 1, further comprising:
switching the antenna configuration of the wireless communication device from the switched antenna configuration to a second switched antenna configuration;
performing, by the wireless communication device, a measurement operation on a second PRS transmission based on the second switched antenna configuration;
generating, by the wireless communication device, a second PRS measurement report indicating the second switched antenna configuration in the second PRS measurement report; and
transmitting, by the wireless communication device, the second PRS measurement report.

8. The method of claim 1, further comprising:
receiving, by the wireless communication device, a second PRS transmission from a second wireless communication device based on the PRS configuration transmission;
performing, by the wireless communication device, a measurement operation on the second PRS transmission based on the switched antenna configuration;
generating, by the wireless communication device, a second PRS measurement report; and
transmitting, by the wireless communication device, a second PRS measurement report based on the measurement operation, the second PRS measurement report not indicating the switched antenna configuration.

9. The method of claim 1, further comprising:
performing, by the wireless communication device, a measurement operation on a PRS transmission received from a second wireless communication device based on the antenna configuration by conducting one measurement for the antenna configuration.

10. The method of claim 1, further comprising:
performing, by the wireless communication device, a measurement operation on a PRS transmission received from a second wireless communication device based on the antenna configuration by conducting a plurality of measurements for a plurality of signal paths of the antenna configuration, each measurement for a corresponding signal path of the plurality of signal paths.

11. An apparatus configured for wireless communication, the apparatus comprising:
a memory storing processor-readable code; and
at least one processor communicatively coupled to the memory, the at least one processor configured to cause the apparatus to:
receive a positioning reference signal (PRS) configuration transmission from a network entity;
switch an antenna configuration of the apparatus;
receive, using the switched antenna configuration, a PRS transmission from a wireless communication device based on the PRS configuration transmission;

perform a measurement operation on the PRS transmission based on the switched antenna configuration;
determine a PRS measurement report including an indication of the switched antenna configuration based on the measurement operation; and
transmit the PRS measurement report including the indication of the switched antenna configuration.

12. The apparatus of claim 11, wherein the antenna configuration includes a beam width parameter, a sub-array parameter, an array parameter, a panel parameter, or a combination thereof.

13. The apparatus of claim 11, wherein the PRS measurement report includes antenna type information, antenna placement information, and beam width information.

14. The apparatus of claim 11, wherein the PRS measurement report includes or corresponds to a UE capability report, a request location information message, or a Provide Location Information message.

15. The apparatus of claim 11, wherein the PRS measurement report is determined based on a group delay associated with the switched antenna configuration.

16. The apparatus of claim 11, wherein the at least one processor is further configured to:
determine a ranging estimate based on a group delay associated with the switched antenna configuration, wherein the PRS measurement report indicates the ranging estimate.

17. The apparatus of claim 11, wherein the at least one processor is further configured to:
receive a first message indicating positioning assistance information, the positioning assistance information determined based on the switched antenna configuration indicated by the PRS measurement report;
determine positioning information based on the positioning assistance information; and
transmit a second message based on the positioning information.

18. A method of wireless communication comprising:
transmitting, by a network entity, a positioning reference signal (PRS) configuration transmission to a wireless communication device; and
receiving, by the network entity from the wireless communication device, a PRS measurement report indicating a new antenna configuration for the wireless communication device when a PRS measurement is performed by the wireless communication device using the new antenna configuration.

19. The method of claim 18, further comprising:
determining, by the network entity, positioning assistance information for the wireless communication device based on the new antenna configuration indicated by the PRS measurement report; and
transmitting, by the network entity, a message indicating the positioning assistance information to a second wireless communication device, the positioning assistance information indicates a location of the wireless communication device, a timing delay associated with the wireless communication device, which antenna panel is more accurate, which antenna panel has less calibration error, or a combination thereof.

20. The method of claim 18, wherein the network entity is a base station, and wherein the wireless communication device is a UE.

21. The method of claim 18, wherein the network entity is a location management function (LMF).

22. An apparatus configured for wireless communication, the apparatus comprising:
a memory storing processor-readable code; and
at least one processor communicatively coupled to the memory, the at least one processor configured to cause the apparatus to:
transmit a positioning reference signal (PRS) configuration transmission to a wireless communication device; and
receive, from the wireless communication device, a PRS measurement report indicating a new antenna configuration for the wireless communication device when a PRS measurement is performed by the wireless communication device using the new antenna configuration.

23. The apparatus of claim 22, wherein the at least one processor is further configured to:
receive multiple second PRS measurement reports; and
perform a multiple hypothesis determination based on the PRS measurement report and the multiple second PRS measurement reports to select a second antenna configuration for the wireless communication device based on multiple hypothesis test results of the multiple hypothesis determination; and
transmit, to the wireless communication device, the second antenna configuration.

24. A method of wireless communication, comprising:
receiving, by a wireless communication device, a positioning reference signal (PRS) configuration transmission from a network entity;
switching, by the wireless communication device, an antenna configuration of the wireless communication device from a first antenna configuration to a second antenna configuration;
receiving, by the wireless communication device using the second antenna configuration, a PRS transmission from a second wireless communication device based on the PRS configuration transmission;
performing, by the wireless communication device, a measurement operation on the PRS transmission based on the second antenna configuration;
generating, by the wireless communication device, a PRS measurement report based on the measurement operation performed using the second antenna configuration; and
transmitting, by the wireless communication device, the PRS measurement report indicating a third antenna configuration and not indicating the second antenna configuration.

25. A method of wireless communication, comprising:
transmitting, by a network entity, a positioning reference signal (PRS) configuration transmission to a wireless communication device;
receiving, by the network entity from the wireless communication device, a PRS measurement report indicating a new antenna configuration for the wireless communication device;
determining, by the network entity, positioning assistance information for the wireless communication device based on the new antenna configuration; and
transmitting, by the network entity, a message indicating the positioning assistance information to a second wireless communication device, the positioning assistance information indicating a location of the wireless communication device, a timing delay associated with the wireless communication device, which antenna panel is more accurate, which antenna panel has less calibration error, or a combination thereof.

* * * * *